United States Patent [19]

Rosu et al.

[11] Patent Number: 5,359,649
[45] Date of Patent: Oct. 25, 1994

[54] CONGESTION TUNING OF TELECOMMUNICATIONS NETWORKS

[75] Inventors: Corneliu S. Rosu, Enskede, Sweden; Tage Dahlquist, Lakewood, Colo.

[73] Assignee: Telefonaktiebolaget L M Ericsson, Stockholm, Sweden

[21] Appl. No.: 769,797

[22] Filed: Oct. 2, 1991

[51] Int. Cl.⁵ .................... H04M 7/00; H04M 15/00; H04M 3/42

[52] U.S. Cl. .................... 379/220; 379/113; 379/115; 379/137; 379/139; 379/207; 379/230

[58] Field of Search .............. 379/111, 112, 113, 114, 379/115, 133, 137, 139, 219, 220, 221, 201, 207, 230

[56] References Cited

U.S. PATENT DOCUMENTS

| | | | |
|---|---|---|---|
| 3,775,566 | 11/1973 | Akimaru et al. | 379/269 |
| 4,009,343 | 2/1977 | Markey et al. | 370/95.3 |
| 4,156,109 | 5/1979 | Kraushaar et al. | 379/137 |
| 4,194,090 | 3/1980 | Yabe et al. | 379/269 |
| 4,456,788 | 6/1984 | Kline et al. | 379/137 |
| 4,669,113 | 5/1987 | Ash et al. | 379/113 X |
| 4,756,019 | 7/1988 | Szybicki | 379/112 |
| 4,763,325 | 8/1988 | Wolfe et al. | 370/104.1 |
| 4,831,373 | 5/1989 | Hess | 340/825.03 |
| 4,931,941 | 6/1990 | Krishnan | 379/220 |
| 4,979,118 | 12/1990 | Kheradpir | 379/221 X |
| 5,042,027 | 8/1991 | Takase et al. | 379/133 X |
| 5,042,064 | 8/1991 | Chung et al. | 379/113 |
| 5,241,588 | 8/1993 | Babson, III et al. | 379/230 X |

FOREIGN PATENT DOCUMENTS 2189111A 10/1987 United Kingdom.

OTHER PUBLICATIONS

Ljungblom, "A Service Management System for the IN", Ericsson Review No. 1 1990, pp. 32–41.

Primary Examiner—James L. Dwyer
Assistant Examiner—Harry S. Hong
Attorney, Agent, or Firm—Johnson & Wortley

[57] ABSTRACT

A system for optimizing the traffic carrying capacity of a telecommunications network having a plurality of elements and a plurality of routes connecting those elements to one another. The controlled congestion in the network is controlled by identifying and limiting defective devices and routes with exaggerated levels of congestion. Disturbance alarm levels are also adjusted to allow increased traffic through the network and the traffic within the network is reconfigured in real time in response to the occurrence of network events to optimize traffic capacity.

31 Claims, 12 Drawing Sheets

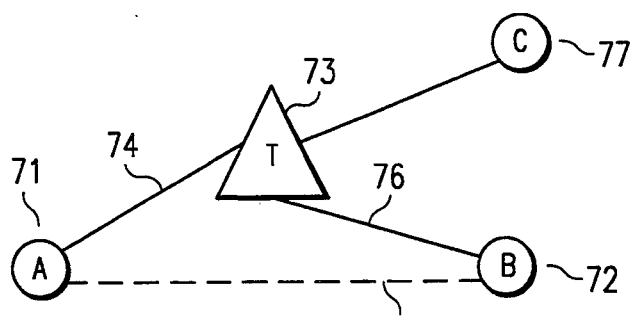
FIG. 5A
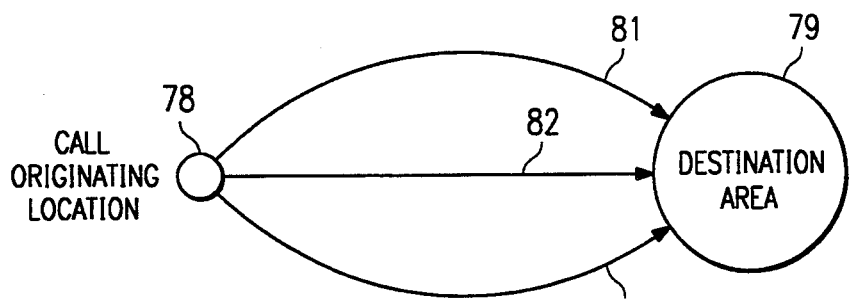
FIG. 5B
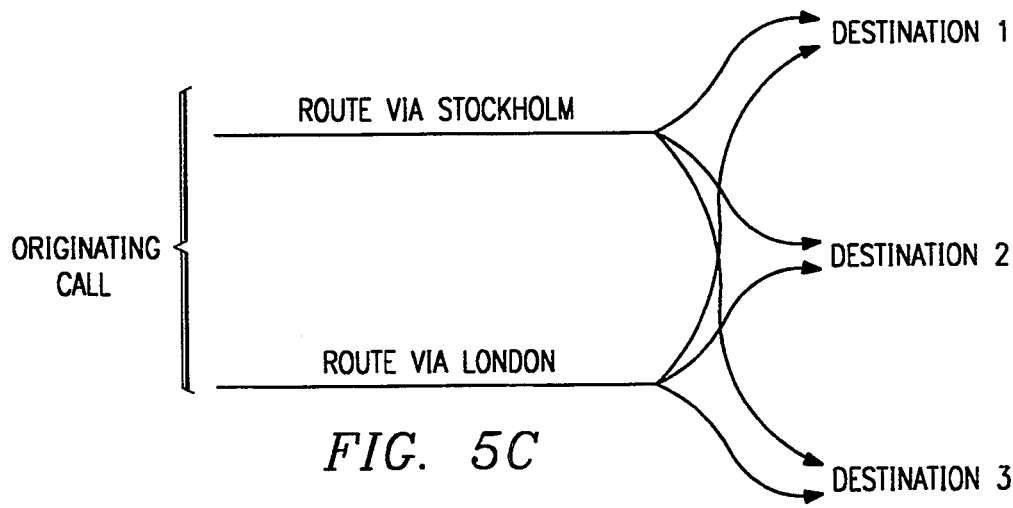
FIG. 5C
| TO FROM | A | B | C | D | E | TOTAL OUTG. TRAFFIC |
|---|---|---|---|---|---|---|
| A |  | 16 | 9 | 21 | 15 | 61 |
| B | 16 |  | 5 | 2 | 3 | 26 |
| C | 12 | 6 |  | 2 | 2 | 22 |
| D | 24 | 2 | 2 |  | 2 | 30 |
| E | 15 | 3 | 3 | 2 |  | 23 |
| TOTAL INC. TRAFFIC | 67 | 31 | 19 | 27 | 22 |  |
FIG. 5D

CONGESTION TUNING OF TELECOMMUNICATIONS NETWORKS

BACKGROUND OF THE INVENTION

1. Field of the Invention

The invention relates to telecommunications networks, and more particularly, to the optimization of congestion conditions within such networks.

2. History of the Prior Art

Telephone instruments and other communications devices located in the same geographic area are conventionally connected with one another by means of switching equipment referred to as an exchange. Communications between telephone/data instruments located in geographic areas separated from one another and connected to different exchanges communicate with one another by means of a complex interconnection of both local exchanges and trunk exchanges linked together into a telecommunications network. Networks may take the form of a grouping of interconnected network elements, such as local exchanges, trunking exchanges, mobile radio exchanges, long distance exchanges, and combinations thereof. At each network level, traffic from one network element, such as an exchange, to another can take various routes through different exchanges. In the design of telecommunication exchanges and the provision of communications circuits for the different routes therebetween, there is often a considerable period of time between the design of the routes and the number of required circuits in each route, based upon measured traffic requirements, and the installation of those circuits. Frequently, the traffic pattern within a network will change drastically between the time that the circuits and routes within the network are designed and their actual implementation, leaving the capacity and arrangement of the communication paths of the network out of date and inappropriate to its requirements. Further, even when the routes of a network are adequate when installed, rapid advances of information technology and explosive growth of circuit requirements between various points can quickly outdate the routing capacity of a network and result in inefficient utilization of available equipment. For example, the addition of one or two international hotels in a region of a network can drastically affect the availability of communication circuits and virtually paralyze the network due to the tremendous increase in the circuit requirements to those hotels. Similarly, the addition of a database communications service supplier or customers with toll-free 800 services, to a network may dramatically increase the requirement for circuits to a particular destination and seriously disturb other communications within the network in the region of that subscriber.

Efficient network traffic management of the communication facilities within a network requires that a sufficient number of circuits are available to handle the traffic requirements to each destination without exaggerated congestion on last-choice traffic routes. It also requires that the network congestion is as even as possible on all last-choice routes and that there not be any undue excess capacity within the circuits of the routes which are actually provided in order to insure efficient utilization of resources. In addition, the telephone administration which operates a network has a limited budget and must get as much efficiency as possible out of the existing resources in each network.

Traffic patterns within a network can vary over a period of weeks or months when, for example, new hotels or new customers providing database services are added to an exchange forming part of the network. Similarly, traffic patterns can vary over a period of days, for example, when an international sporting event lasting several days is held at a particular geographic area within the network. In addition, traffic patterns in a network commonly vary over 24 hours, since traffic increases during certain hours of the business day and decreases to virtually zero during certain hours of the night and early morning.

Traffic patterns within a network are strongly affected by defective devices such as, so-called, "killer trunks" which are faulty trunk circuits which appear to be available to carry traffic, but which accept the traffic only to terminate the call and again appear available to take more traffic. In addition, traffic within a network is affected by, so-called, "black spots" which are routes which are experiencing exaggerated congestion, i.e., levels of congestion which are much higher than the average route congestion within the network. The worst of each of the conditions are also sometimes referred to as deficiency "tops" within a network.

In the past, traffic management within a communications network has included procedures for periodically surveying the traffic patterns within the network and changing the configuration of circuits and routes in order to more efficiently handle the traffic. In addition, more routes and circuits are added to a network in anticipation of high call densities to a particular location or a particular region and to local events within that region. Conventional network management systems are also capable of changing the relative distribution of traffic loads between selected routes within the network in order to more efficiently balance the current utilization of the network. However, conventional traffic network management systems and procedures have generally strived to increase the availability of circuits and routes within a network to handle individual traffic demands rather than to reconfigure by redimensioning the routes and circuits within the network at another higher grade of service so that the overall network efficiency is maximized.

Prior art network control systems generate network traffic statistics and execute network supervision functions which detect overloaded parts of the networks, defective device groups, and allow the adjustment of alarm limits within exchanges of the network to attempt to increase the efficiency of communication within the network. However, if congestion levels and disturbance levels within the network are too low, the network facilities become too expensive on a per call basis. If network congestion is too high, revenue is lost.

The method and system of the present invention strives to maintain an even level of congestion on the last-choice routes at each network level along with the maintenance of alarm limits within each portion of the network at average network levels in order to maximize highest circuit availability and optimize network economy and utilization of manpower. The present system also dynamically controls the network based upon live-traffic data to achieve the optimum use of existing routes within and between the exchanges of the network by continuously reducing the network deficiency tops within each portion of the network and attempting to achieve an even level of congestion throughout the network. The present system also redimensions the existing resource in real-time based upon live traffic data, and determines the maximum traffic which can be carried by the existing resources at a desired grade of service, i.e. , congestion level. The overflow traffic which has no chance to result in conversation is then limited as closed as possible to its origin by using network management protective functions.

SUMMARY OF THE INVENTION

The invention relates to a telecommunications network in which a plurality of exchanges are interconnected by telecommunications routes each having a plurality of circuits. In one aspect, the system of the present invention includes identification and elimination of both overloaded parts of the network as well as defective device groups in the routes of the network to achieve coarse tuning of the congestion within the network. The system also includes adjustment of the disturbance alarm limits within the network so that alarms are produced only in the event the condition producing the alarm is detrimental to the overall operation of the network. The system of the invention reconfigures the network to improve its traffic carrying capacity by measuring the busy-hour call congestion percentage and number of call bids of the last-choice routes within the network. The number of busy-hour lost calls is calculated for each of the last-choice routes and all last-choice routes which have a busy-hour lost calls number greater than a preselected value are selected. All selected last-choice routes which terminate in the next exchange are either repaired or rerouted.

In another aspect, the system of the invention comprises a method of reconfiguring the network to improve its traffic carrying capacity by first measuring the busy-hour call congestion percentage and number of call bids of the last-choice routes within the network and then calculating the number of busy-hour lost calls for each of the last-choice routes. All last-choice routes which have a busy-hour lost calls number greater than a preselected value are selected and all selected last-choice routes which terminate in the next exchange are identified. Next, the disturbance level on all trunks in the identified selected last-choice routes is measured and the average disturbance level of all trunks in the identified selected last-choice routes is calculated. All trunks which have a disturbance level greater than the calculated average disturbance level are repaired.

In still another aspect, the method of the invention also includes measuring the traffic dispersion of each of the selected last-choice routes which were not identified as terminating in the next exchange and then determining the destination of each of the selected last-choice routes which contributes most to the congestion of the route. The disturbance level of all trunks in each of the last-choice routes which lead to the determined destination is measured and the average disturbance level of all trunks measured leading to the determined destination is calculated. All trunks leading to the determined destination which have a disturbance level greater than the average disturbance level are repaired with a high level of priority.

In addition, the invention also includes measuring the number of disturbances during the busy-hour in each last-choice route in the network, measuring the number of occupied trunks during the busy-hour in each last-choice route in the network and then calculating for each last-choice route in the network a value of busy-hour relative disturbance level. An average value of busy-hour relative disturbance level for all last-choice routes in the network is calculated and the disturbance supervision alarm limit for each last-choice is adjusted to be equal to the average value.

An additional aspect of the invention includes optimizing the traffic carrying capacity of a telecommunications network having a plurality of exchanges and a plurality of routes connecting those exchanges to one another by measuring the degree of congestion within the traffic being carried by each route within the network and calculating the average value of congestion within the traffic throughout all of the routes in the network. The network is then redimensioned by rerouting and limiting the traffic within the routes to bring the degree of congestion within the traffic on each route approximately equal to the average value of congestion within the traffic throughout all of the routes in the network.

A still additional aspect of the invention includes optimizing the traffic carrying capacity of a telecommunications network having a plurality of exchanges and a plurality of routes connecting those exchanges to one another by calculating the traffic carrying capacity of the network for a selected degree of congestion within the network and measuring the traffic being offered to the network. The calculated traffic carrying capacity is then compared to the measured traffic to determine a value of overflow traffic. The overflow traffic is limited as close to the origin thereof as possible within the network.

A further additional aspect of the invention includes optimizing the traffic carrying capacity of a telecommunications network having a plurality of exchanges and a plurality of routes connecting those exchanges to one another and in which both the exchanges and the routes have been previously dimensioned based upon anticipated traffic and traffic interests to various destinations of the routes. A value is selected for the degree of congestion which is to be permitted within the network and the value of the traffic which has historically been carried by the network for particular days of the year and particular hours of the day is stored in memory. The network is redimensioned in response to the detection of any change in the traffic carrying capacity of the network and the redimensioning is based upon the then existing traffic carrying resources following the change in the traffic carrying capacity of the network. The maximum traffic carrying capacity of the reconfigured network is calculated for the particular value of congestion which has been selected and the traffic carrying capacity of the redimensioned network is compared to the stored historical values for the same period of time to obtain the difference therebetween as overflow traffic. The overflow traffic is limited as close to the origin thereof within the network as possible.

BRIEF DESCRIPTION OF THE DRAWINGS

For an understanding of the present invention and for further objects and advantages thereof, reference can now be had to the following description, taken in conjunction with the accompanying drawings in which:

FIG. 5A is a chart representing a traffic interest function within a network;

FIG. 5B is a chart illustrating traffic distribution per route within a network;

FIG. 5C is a chart illustrating traffic dispersion per destination within a network;

FIG. 5D is an illustrative a traffic interest matrix within a network;

DETAILED DESCRIPTION

Figure 1:
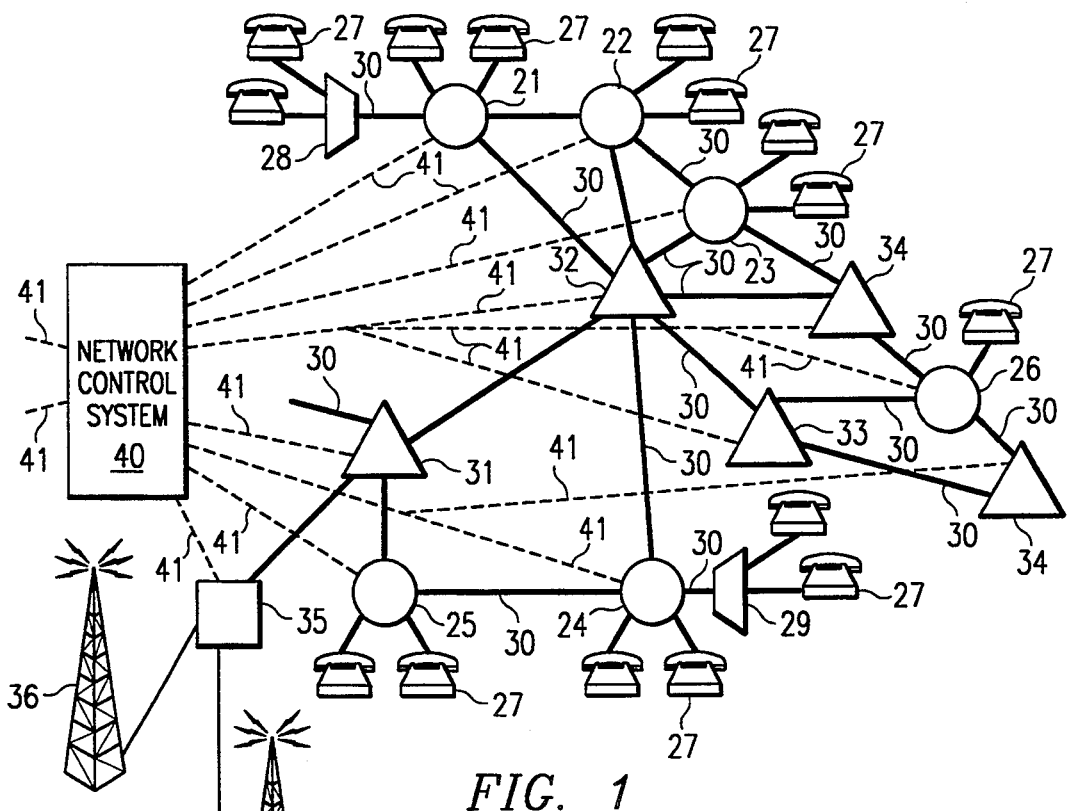
FIG. 1 is a block diagram of an exemplary network within which control in accordance with the system of the present invention may be effected.

Turning first to FIG. 1, there is shown an illustrative schematic diagram of a telecommunications network including a plurality of local exchanges 21-26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31-34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38. In addition, other telecommunications services such as data bases and intelligent networks may also be connected to various ones of the exchanges shown. Between each of the exchanges 21-35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21-35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the congestion conditions within the network in accordance with the system of the present invention.

Figure 2:
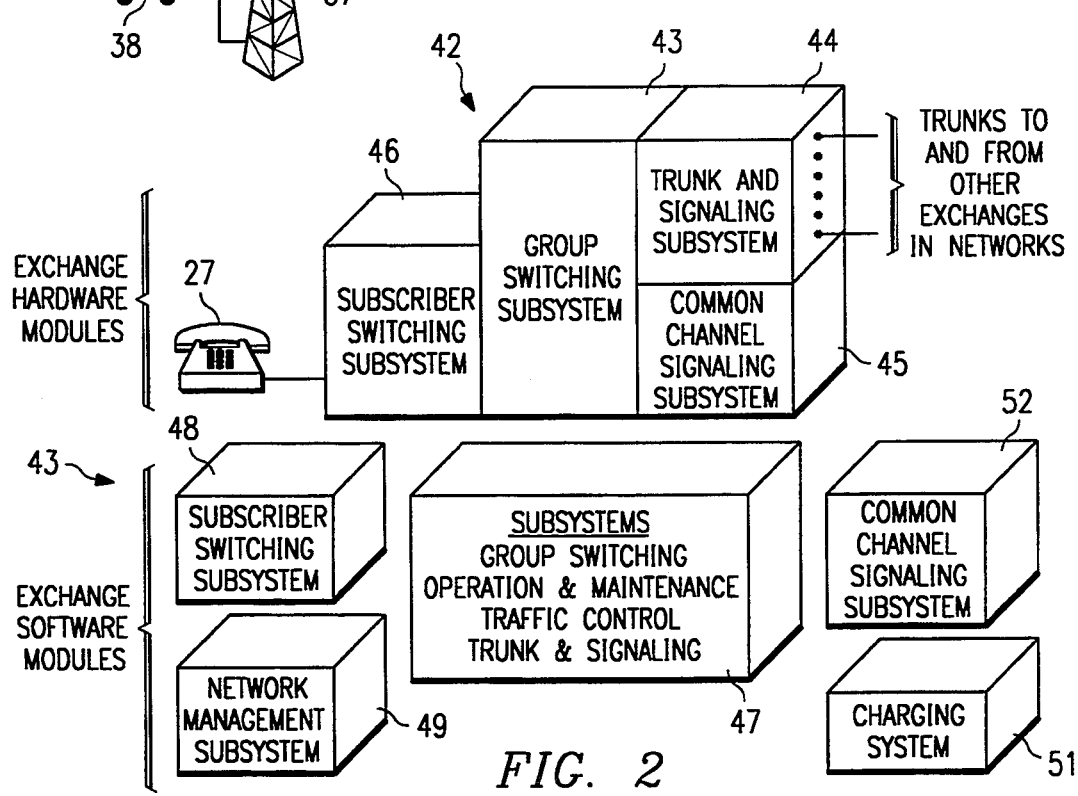
FIG. 2 is a block diagram of an exemplary exchange within the network of FIG. 1.

Referring next to FIG. 2, there is shown a block diagram of an illustrative stored program controlled (SPC) switching system which may be used as one or more of the local, trunking, or mobile exchanges 21-35 in the network of FIG. 1. By way of illustration, the exchange of FIG. 2 may be of the type manufactured by Telefonaktiebolaget L M Ericsson and referred to as the AXE exchange, an earlier version of which is disclosed in the article by Mats Eklund, et al., entitled "AXE 10-System Description," published in *Ericsson Review*, No. 2, 1976, which is hereby incorporated herein by reference. The exchange 40 is divided generally into two parts. A first portion 42, which includes both hardware and software, is shown in the upper part of FIG. 2, and a second portion 43, which includes only central software, is shown in the lower part of FIG. 2. A third regional software portion is not illustrated in FIG. 2. Portion 42 includes a group switching subsystem 43 of both hardware and software which sets up, supervises, and clears connections through the group switch. The selection of a path through the switch takes place within the software of this subsystem. A trunk and signalling subsystem 44, also made up of both hardware and software, handles the signalling over and the supervision of connections made to other exchanges in the network. A common channel signalling subsystem 45, also made up of both software and hardware, contains the functions for signalling, routing, supervision and correction of messages sent between exchanges in accordance with established protocol. In case the exchange of FIG. 2 is a local exchange, it would include a subscriber switching subsystem 46, also made up of both hardware and software, which handles traffic to and from subscribers 27 and 38 connected to the exchange.

The software modules 43 of the exchange of FIG. 2 include one block 47 comprising a plurality of software systems which consist of a group switching subsystem, an operations and maintenance subsystem, a traffic control subsystem, and a trunk and signalling subsystem. The function of the software of the group switching subsystem was described above in connection with module 43. The operations and maintenance subsystem functions to permit various functions related to statistics and supervision within the exchange, while the traffic control subsystem includes the setup, supervision and clearing of calls, the selection of outgoing routes, the analysis of incoming digits, and the storage of subscriber categories. The function of the trunk and signalling subsystem software was described above in connection with module 44. The software modules 43 also include a subscriber switching subsystem 48 which handles traffic to and from subscribers connected to the exchange, a network management subsystem 49 which supervises traffic flow through the exchange and introduces temporary changes in that flow, a charging subsystem 51 which handles call metering functions and a common channel signalling subsystem 52, described above in connection with module 45.

Figure 3:
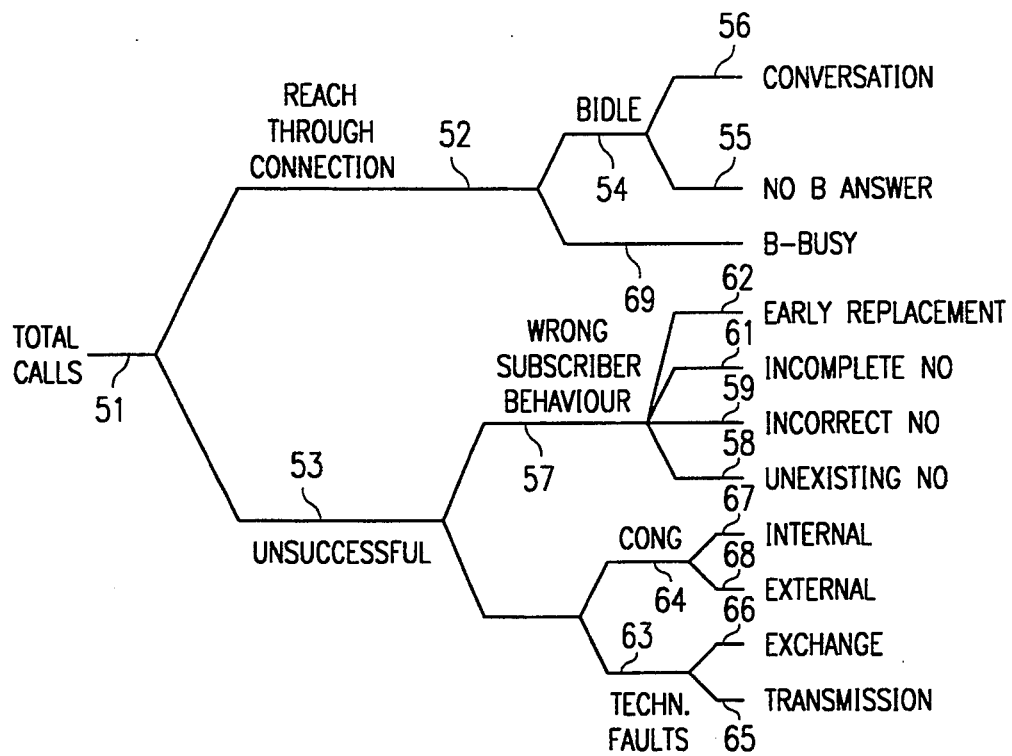
FIG. 3 is a chart illustrating the possible results of call attempts within a network.

Referring next to FIG. 3, there is shown an example of a simplified call distribution possibility chart illustrating the results which can potentially occur upon each attempted call within the network. For example, in the network illustrated in FIG. 1, attempting a call from an A-subscriber to an intended recipient, a B-subscriber, can have several outcomes. As shown in FIG. 3, among a selected number of total calls attempted at 51, some will reach a through connection at 52 while others will be unsuccessful at 53. Among those who reach a through connection, a certain number will reach a B-busy condition at 69 while others will encounter B-idle at 54 and either will receive no answer from the call to the B-subscriber at 55 or complete a through connection and engage in conversation at 56. Among the unsuccessful calls from branch 53, some will be unsuccessful because of wrong subscriber behavior on branch 57 which can result from a number of actions on the part of the subscriber. For example, a subscriber may dial a nonexistent phone number at 58, an incorrect phone number at 59, an incomplete number at 61 or hang up earlier at 62. In addition, the unsuccessful calls at branch 53 may be uncompleted as a result of either technical faults along branch 63 or call congestion along branch 64. Technical faults may be either as a result of transmission faults at 65 or exchange faults at 66. Call congestion along branch 64 may result from either internal congestion at 67 or external congestion at 68. As can be seen from the diagram of FIG. 3, the failure to complete a call connection and the resultant call charging produces a loss of revenue to the network. A major goal of a network traffic management system is to try to minimize the number of unsuccessful calls due to congestion and/or technical faults within the network.

Figure 9:
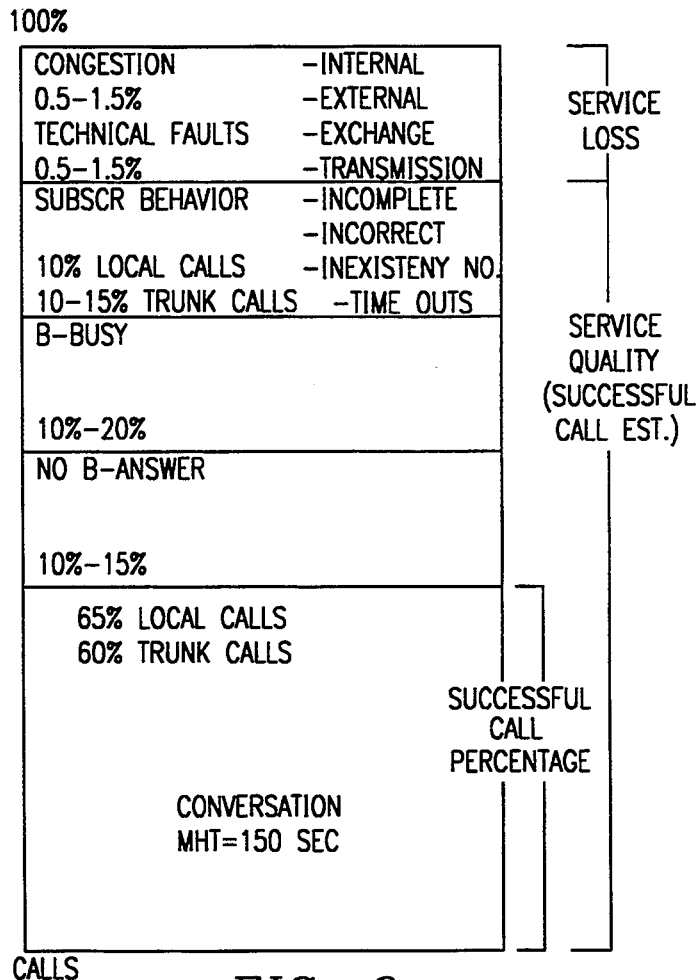
FIG. 9 is a performance graph representing the performance of an exchange within a network.

Referring briefly to FIG. 9, there is shown a statistical compilation of various network variables obtained from service quality statistics measurements, including those discussed above in connection with FIG. 3, which are monitored in order to compare the network performance results and set the performance standards within the network. The network parameter, service loss, which, of course, means a loss of network revenue, is the total loss of service due to technical faults and congestions expressed as a percentage of the total calls attempted. In evaluating service loss, a differentiation is made between technical losses, such as those due to exchange faults and transmission faults, and traffic losses, for example due to internal exchange congestion, external exchange congestion, and calls blocked due to network traffic management actions within the exchanges and within the network. Another network performance variable, service quality (estimated successful call completions), is calculated as one hundred percent minus the service loss, and expressed as a percentage. This statistic includes all calls which do not result in conversation and allows for all other types of subscriber losses in addition to technical losses and traffic losses. As also illustrated in FIG. 9, subscriber behavior losses include calls in which the calling subscriber is timed out, an incorrect number is dialed, a nonexistent number is dialed, and the calling subscriber hangs up prematurely. Actual subscriber losses arise as a result of calls in which the B-subscriber is busy, does not answer, is out of order, or those in which the B-subscriber is barred from incoming calls. The successful call percentage within the network performance variable statistics, is that percentage of calls which results in an actual conversation. The network performance standards include the related values of successful call percentage and other service quality variables which a telephone administration agency strives to provide their subscribers. The successful call percentage factor is used as a guideline to initially dimension the network and to set service quality standards for other components in the service quality plan of the network. The network performance results are the actual, measured values of the performance variables. The differences between the performance results and the performance standards set by the network administration indicate those areas in which network improvements are required.

Figure 4:
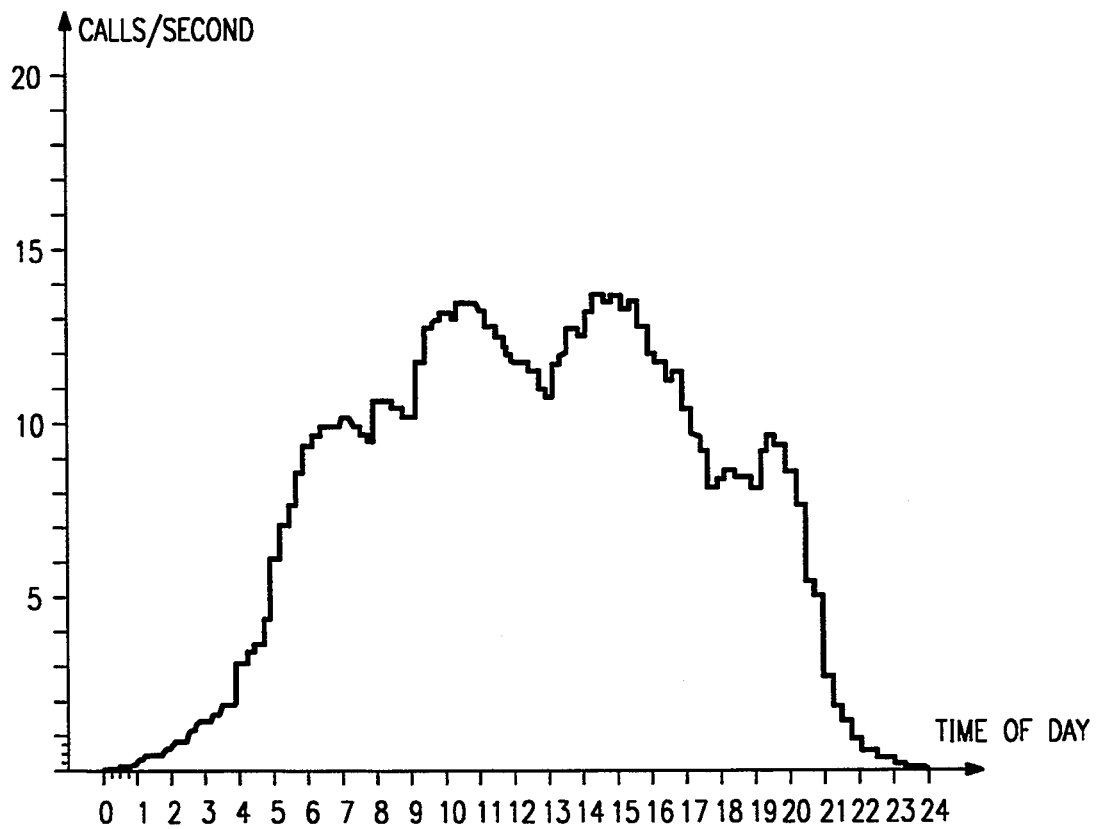
FIG. 4 is an illustrative graph of the traffic profile of an exchange as a function of time throughout a 24-hour.
Figure 6:
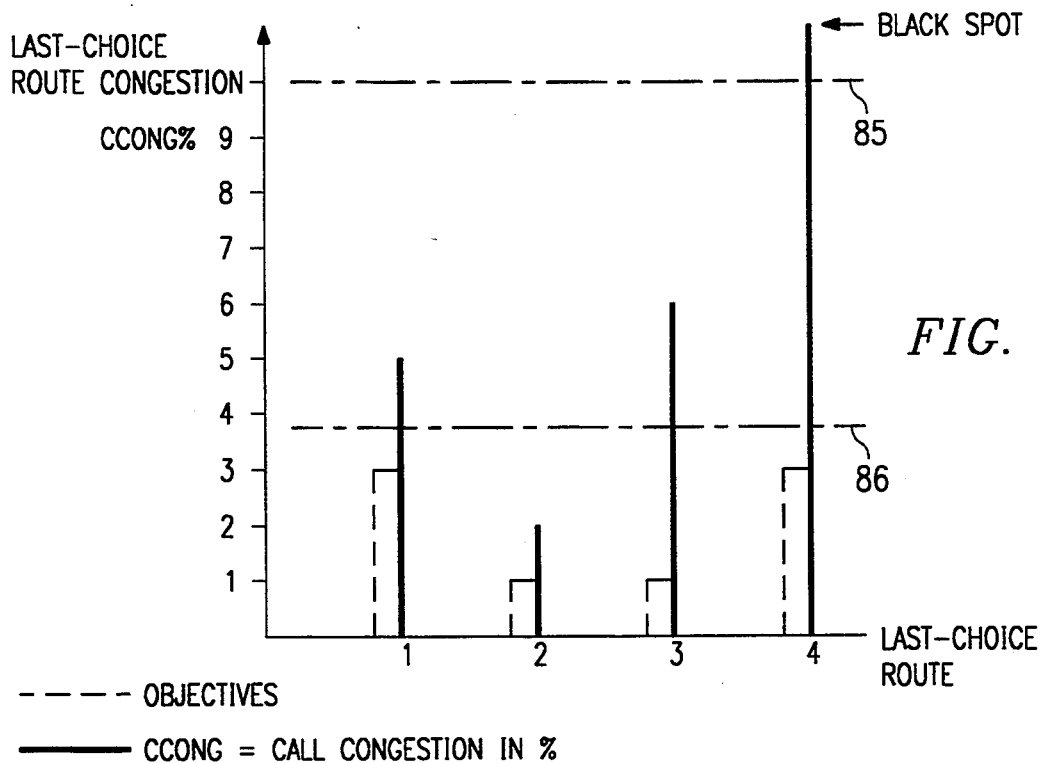
FIG. 6 is an illustrative chart of percentage call congestion on last-choice routes within a network.

Referring next to FIG. 4, there is shown an exemplary traffic profile which is used to obtain the correct busy-hour dimensioning data of the network and to obtain the noncoincident busy-hour data for network traffic management. The traffic profile of FIG. 4 is, in effect, the number of calls per second within a given exchange or network plotted as a function of the time of day. Traffic recording measurements on routes within the network are initiated by using traffic recording-/measuring data gathering request functions conventionally built into the software of the exchanges to provide good statistical instruments which enable the evaluation of congestion data within the network. As can be seen from FIG. 4, the call density varies as a function of time and enables the handling of network reconfiguration functions based upon anticipated call density. FIG. 6 shows the distribution call congestion parameter (CCONG) obtained from traffic measurement on the last-choice routes of the network initiated during the busy-hour within portions of a network.

Most modern SPC telephone exchanges, such as the Ericsson AXE-10 referred to above, include software functions for the measurement, recording and output of a wide variety of traffic and fault related data. By way of example, Table 1 lists parameters related to service quality which are periodically measured in one exemplary exchange.

TABLE 1

| | |
|---|---|
| NAAFTD | Number of A-replacements after dialling; |
| NABEFA | Number of A-replacements before B-answer, e.g., within 10 seconds; |
| NABEFA2 | Number of A-replacements before B-answer, exceeding, e.g., 10 seconds; |
| NABEFD | Number of A-replacements before dialling; |
| NADURD | Number of A-replacements during dialling; |
| NBANS | Number of B-answers (during the measurement period); |
| NBBUSY | Number of calls B-subscribers busy; |
| NBNDEX | Number of dialed B-numbers which do not exist; |
| NBOUT | Number of B-numbers out of order, interception marked B-subscriber and B-numbers barred for incoming calls; |
| NCALLS | Number of calls; |
| NCAWNDA | Number of calls offered to busy subscribers, with call waiting that are not answered; |
| NCONGGS | Number of congestions in the group switch; |
| NCONGJY | Number of congestions in junction terminals; |
| NCONGOT | Number of congestions in outgoing trunks (last-choice route); |
| NCONGTS | Number of congestions in time switch; |
| NCONGNW | Number of congestions in the network (i.e., in next exchange); |
| NFSIGCR | Number of faulty signals received in code receiver; |
| NFSIGCS | Number of faulty signals received in code sender; |

TABLE 1-continued

| | |
|---|---|
| NFSIGIT | Number of faulty signals received in incoming trunk; |
| NFSIGOT | Number of faulty signals received in outgoing trunk; |
| NHWFCR | Number of hardware faults in code receiver; |
| NHWFCS | Number of hardware faults in code sender; |
| NHWFIT | Number of hardware faults in incoming trunk; |
| NHWFJT | Number of hardware faults in junction terminal; |
| NHWFOT | Number of hardware faults in outgoing trunk; |
| NHWFTS | Number of hardware faults in time switch (SSS); |
| NNMBLO | Number of calls blocked due to network management subsystem actions; |
| NRCSPP | Number of calls released in speech position due to faults in exchange, devices, lines or trunks; |
| NTBEFA | Number of time outs before B-answer; |
| NTHCON | Number of through-connected calls; |
| NTOBEFD | Number of time outs before dialling; |
| NTODURD | Number of time outs during dialling; |
| NTOCS | Number of time outs in code sender; and |
| NTOOT | Number of time outs in outgoing trunk. |

The measured service quality statistic parameters defined in Table 1 are then used to calculate the service quality statistics of the exchange(s) or route(s) shown in FIG. 9 and, hence, a portion of the network of interconnected exchanges.

Table 2 shows a number of equations and relationships used to calculate and assemble service quality statistics in exemplary exchanges and thereby produce an overall network performance graph. A related composite of data is shown in FIG. 9.

TABLE 2

SERVICE QUALITY STATISTICS EQUATIONS

$$\text{SUCCESSFUL CALL PERCENTAGE} = \frac{\text{NBANS} - \text{NRESPP}}{\text{NCALLS}} \%$$

$$\text{SERVICE QUALITY} = \frac{\text{NTHCON}}{\text{NCALLS}} \%$$

B-SUB STATUS
B-BUSY = NBBUSY %
B-NO ANSWER = (NCAWNOA + NBOUT) %
A-BEHAVIOR
REPLACEMENTS = (NABEFD + NADURD + NAAFID + NABEFA1 + NABEFA2) %
TIME OUTS = (NTOBEFD + NTODURD + NTBEFA) %
UNEXISTING NO. = NBNOEX %
INCORRECT NO. = CANNOT BE SPECIFIED (SEE TRAFFIC OBSERVATION FUNCTION)
SERVICE LOSS = (100% − SERVICE QUALITY)
CONGESTION
INTERNAL CONGESTION = (NCONGOT + NCONGTS + NCONGGS + NCONGJT) %
EXTERNAL CONGESTION = (NNBLO + NCONGNW) %
TECHNICAL FAULTS
EXCHANGE = (NHWFIT + NHWWFOT + NHWFCR + NHWFCS + NHWFTS + NHWFJT) %
TRANSMISSION = (NFSIGIT + NFSIGCS + NTOOT + NTOCS + NFSIGOT + NFSIGCR) %

Referring next to FIG. 5A, there is shown a diagram illustrating the traffic interest function within the network. Here, the focus of interest is on the traffic directed from exchange A-71 to exchange B-72. That traffic is illustratively routed via trunking exchange 73. Thus, by utilizing traffic dispersion data gathering programs which enable the evaluation of whether new routes are economically justified between exchanges not directly connected, for example, between exchanges 71 and 72, networks are reconfigured by adding additional routes. In this case, traffic statistics may reveal that a large portion of the traffic between exchanges 71 and 73 can be connected directly to exchange 72 via a proposed new route 75 and thereby eliminate sending traffic through intermediate exchange 73 via routes 74 and 76. Similarly, the traffic between exchange A-71 and exchange C-77 may be evaluated by traffic dispersion per destination as shown in FIG. 5C.

Referring to FIG. 5B, there is shown an illustrative diagram of a traffic statistic known as traffic distribution per route. For example, between the call origination location 78 and the destination area 79, there are a plurality of different routes 81-83 over which traffic may be routed. This traffic dispersion per route data evaluates the absolute number and percentage of the traffic to the destination in question on each of the three routes between the origination and termination destinations.

FIG. 5C illustrates the traffic dispersion per destination measurement. Traffic recording functions generate data which documents the percentage of calls from an originating location which are routed via Stockholm and which are intended for each of the destination 1, 2 and 3, as well as the percentage of calls routed via London which are intended for each of the destinations 1, 2 and 3. Traffic dispersion data documents both the distribution per route and dispersion per destination of traffic for each route within the network.

Referring next to FIG. 5D, there is shown an illustrative traffic dispersion matrix which depicts the traffic interest from one point of the network to another point in the network regardless of how the network is built up. In the matrix of FIG. 5D, five primary exchanges of a numbering area within a network A-E are statistically evaluated to determine the interest and traffic between each exchange and each of the other exchanges. For example, the traffic from B to C is five Erlang and the traffic from C to B is six Erlang. The sum of the rows correspond to the total outgoing traffic and the sum of the columns to the total incoming traffic into the numbering area. Thus, exchange B has a total of 26 Erlang outgoing and 31 Erlang incoming.

Traffic recording statistics gathering is relatively well established in conventional stored program control ( SPC ) systems and exchanges. Most conventional modern exchanges and networks provide software functions which are capable of gathering the required traffic data which the system of the present invention uses in the reconfiguration of a network in order to optimize the congestion tuning of that network.

Referring now to FIG. 6, there is shown a chart of last-choice route congestion, expressed as a percentage of call congestion, plotted for a plurality of different last-choice routes within a part of a network. The solid lines for each last-choice route illustrate the actual call congestion factor $$\frac{Y\text{-rejected}}{Y\text{-offered}},$$

where Y is the traffic in calls per unit of time in percentage, while the dotted lines illustrate the projected call congestion which the network administration strives to achieve within those particular routes. The upper transverse line 85 is an exemplary level of a last-choice busy-hour congestion limit set by the quality of service plan of the administration operating the network. That is, no congestion is to be allowed within that portion of the network greater than that limiting value. The other, lower transverse line 86 illustrates the average congestion of all last-choice routes within the network. The average last-choice route congestion is calculated by summing from one to N the number of call bids times the call congestion divided by the summation from one to N of the number of call bids, as follows:

$$\frac{\sum_{i=1}^{i=N} (N\ BIDS_i)\ (C\ CONG_i)}{\sum_{i=1}^{i=N} N\ BIDS_i} \quad (1)$$

From the exemplary chart of FIG. 6, it can be seen that the 4th last-choice route has exceeded the maximum limit for call congestion with the network and, hence, represents a "black spot" to be eliminated or "cut" in accordance with the system of the present invention.

In the system of the present invention it is preferred that no last-choice route have a busy-hour congestion which is higher than the call congestion limit selected by the administration and illustrated by line 85 in FIG. 6. It is also preferred that the busy-hour call congestion of each last-choice in the network part is equal to the network temporary average call congestion, that value illustrated by horizontal line 86 in FIG. 6. This condition would yield maximum network efficiency. FIG. 6 also relates to the identification of the worst last-choice routes within the network preparatory to elimination of congestion on those routes to improve the efficiency of the overall network.

Since network efficiency is really a matter of maximizing revenues received from calls, congestion on certain routes can more seriously affect revenues than congestion on others. That is, congestion on a large route with a large number of circuits can interfere with network performance much more than the equivalent congestion on a small route. For this reason, the system of the present invention considers the number of loss calls in the last-choice routes.

Figure 7:
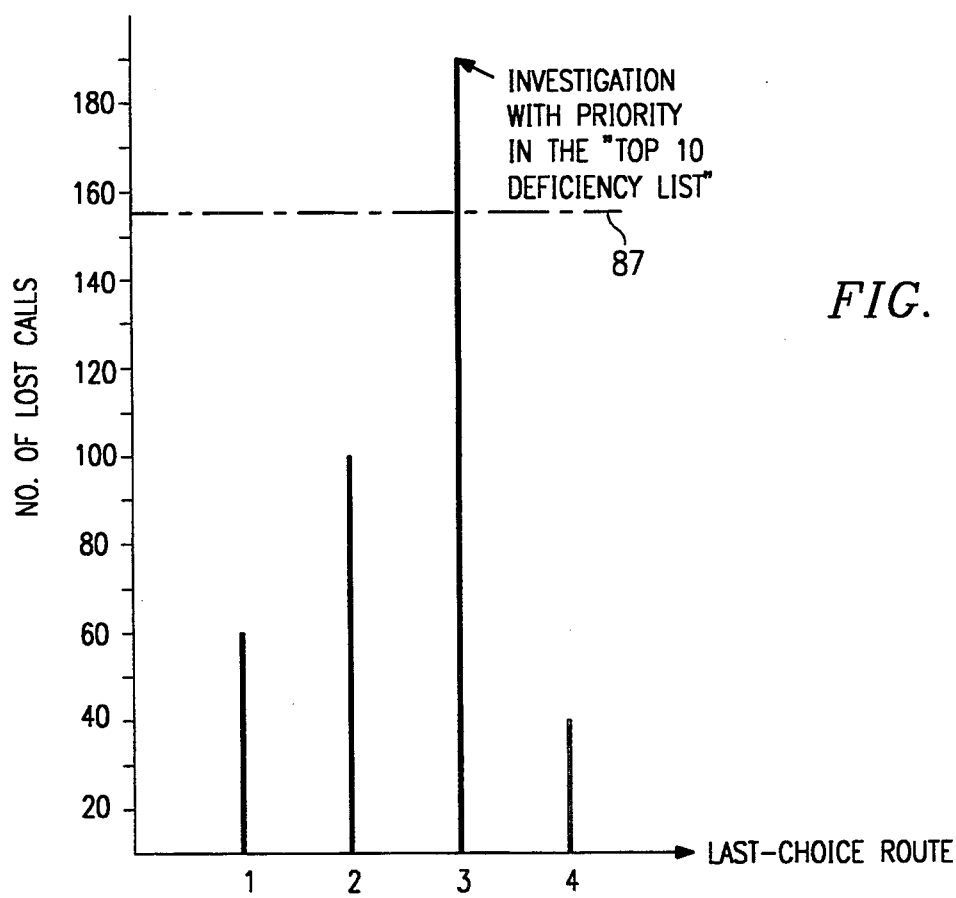
FIG. 7 is an illustrative chart of number of lost calls on last-choice routes within a network.

Referring next to FIG. 7, there is shown a chart of the lost-calls parameter plotted for the plurality of last-choice routes within a network shown in FIG. 6. The lost calls parameter is equal to the number of bids (or call attempts), times the call congestion factor. The number of bids, N BIDS, is obtained from the same traffic measurement functions as the call congestion parameter, C CONG. The relationship between the number of lost calls and call congestion in the last-choice routes illustrated in FIG. 7 is shown in Table 3 set forth below:

TABLE 3

| Route | N Bids | Call Congestion | Number of Lost Calls |
|---|---|---|---|
| 1 | 100 | 5% | 5.00 |
| 2 | 450 | 2% | 9.00 |
| 3 | 300 | 6% | 18.00 |
| 4 | 25 | 11% | 2.75 |

The upper transverse line 87 in FIG. 7 is an exemplary level of a number of lost calls of a last-device route set by the quality of service plan of the administration operating the network. No lost-device route is to be allowed within the portion of the network having a greater number of lost calls than that limiting value. The actions leading to elimination of these tops must be included in the worst deficiency list.

One aspect of the system of the present invention includes a periodic performance audit or switch reliability review (SRR) of the exchanges and routes within the network. Frequently, sudden traffic jumps within the network are caused by new customer locations, new services, and other situations which require the exchanges to work in environmental conditions which are completely different than those which were originally forecast and for which the routes within the network were designed. Such deviations are detected during a periodic performance audit of the exchange and network area.

A good statistical instrument, particularly for short term forecasting, is traffic recording measurements performed on all last-choice routes of the exchanges in a network. From the results of such measurements, the call congestion parameters are evaluated and a "black spot" is indicated if: (a) a last-choice route ends in a terminating exchange, (b) the congestion in that last-choice route "X"%, is higher than or equal to the limit value set by the quality of service plan of the administration, and (c) there is no deficient device group within the route which disturbs the call process. If a "black spot" is present, the route should be redesigned to eliminate it. A table of Erlang loss formulas used for originally planning the number of circuits in a network of routes can be used when the proposed traffic density is known. The traffic offered to the route, A-Offered, can be computed, after correction of the impact of regenerated traffic, using the following formula when the call congestion, C Cong, and traffic density, TRAFF, parameters in Erlang, are known:

$$A\text{Offered} = \frac{TRAFF}{1 - C\ Cong}$$

If the traffic using the last-choice route does not terminate in the next exchange, the destinations which contribute the most to call congestion on the route must be identified. However, it must first be determined whether there are any abnormal disturbances present within the route. This involves the identification of deficient devices involved in the setting up of the call to the destination in question, referred to as "killer trunks." Since call congestion can result from disturbances caused by deficient device groups involved in the call process, the service quality statistics measurements within the exchange which are initiated on a particular route will enable the identification of "killer trunks." Once an abnormally congested route has been identified within the system of the present invention, and if the congestion is not generated by deficient device groups, such as "killer trunks," it must be decided if there is idle capacity on another route capable of reaching the destination in question. The data required for this evaluation is obtained by using the traffic distribution per route measurements as illustrated in FIG. 5B.

In seeking idle network resources to relieve congestion, it must first be decided if idle network resources exist between overloaded sources and congested destinations through use of the traffic distribution per route measurement illustrated in FIB. 5B. In effect, it is determined from the exchange what other routes lead to the congested destination and if one or more of them has a congestion less than the call congestion objective sought by the network administration. The resulting evaluation employs the use of the conventional software functions within the exchanges of a network to enable the assignment of additional traffic to another less congested route leading to the congested destination.

A traffic deficiency matrix on rejected traffic similar on the traffic interest matrix shown in FIG. 5D will help identify the worst congested routes within the network. This is compiled based upon the peaks within the matrix. If the example of FIG. 5D was a traffic deficiency matrix, rather than a traffic interest matrix, the rejected traffic between B and C would be five Erlang and the rejected traffic from C to B would be six Erlang. The sum of the rows would correspond to the total outgoing rejected traffic and the sum of the columns to the incoming rejected traffic. Consequently, exchange A would have a total of 61 Erlang rejected outgoing traffic and 67 Erlang rejected incoming traffic. The conclusion reached is that the A exchange traffic should be analyzed first because of the greater congestion.

Since the network administration is interested in maximizing revenues, the charging statistics within the traffic recording data is used to compare the administration revenue per customer before and after the implementation of network reconfigurations in accordance with the system of the present invention.

Network dependent alarm limits are also reconfigured in accordance with the present invention so that disturbance supervision within the exchanges of the network produces enhanced network efficiency. Since the system of the present invention strives to continuously cut deficiency tops, disturbance data is used to collect information about route disturbances so that priorities can be set for maintenance activities. In doing so, the disturbance tops are continuously eliminated and the network average disturbance levels automatically decreased over a period of time. By gathering disturbance statistics for each route during the busy-hour using disturbance statistics gathering portions of the traffic measuring and recording functions of each exchange, the number of disturbances during the measuring period is obtained. A relative disturbance value is obtained by dividing the number of disturbances by the number of occupied devices during the measuring period.

Figure 12:
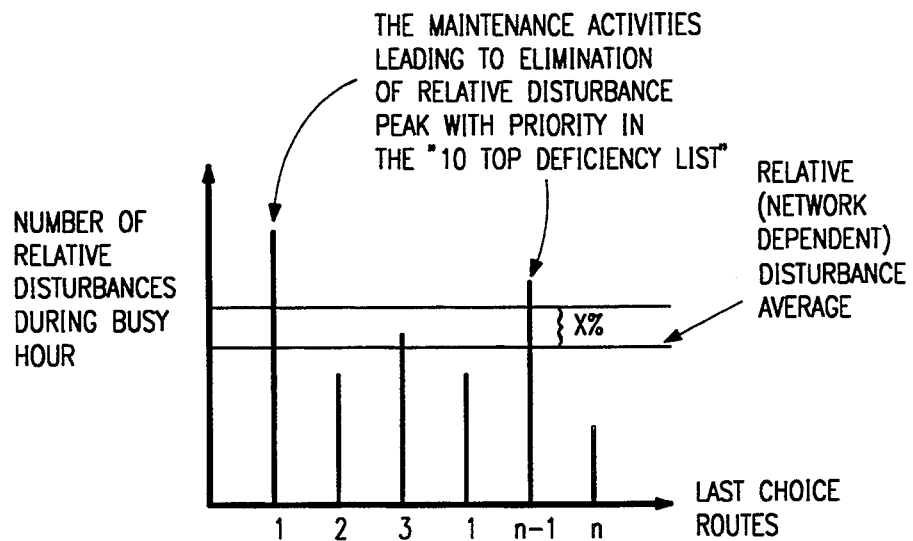
FIG. 12 is an illustrative graph of relative disturbance levels within the network for various last-choice routes.

Referring now to FIG. 12, there is illustrated a distribution of relative disturbance levels during the busy-hour for each last-choice route in the network. One goal of the present system is to produce a disturbance alarm only if the relative disturbance level in a route is more than a selected percentage, X%, greater than the network average disturbance level, as determined by the quality of service plan of the administration. The peaks within the relative disturbance level chart reveal deficient routes which should be included on the deficiency list and "cut" to improve network congestion performance in accordance with the invention. Disturbance registration, seizure quality statistics and device group tests within the traffic measurement routines are used in deciding whether the number of high disturbances are inside or outside the exchange area. I f the disturbances are generated outside the exchange area, the allowed disturbance level parameter of the route is set to, for example, twice the actual disturbance level obtained from live traffic. Thus, the disturbance level can be varied between individual routes of the exchange to avoid unnecessary alarms and maintenance activities. Usually the alarm limits have been estimated at data transcript by compiling similar data from other exchanges and markets, therefore the threshold levels of the routes should be continuously adjusted.

When the a number of blocked or faulty devices in a route exceeds a preset threshold value, a blocking supervision alarm is initiated for that route. The limit value blocking (LVB) parameters associated with blocking supervision are adjusted to produce a route blocking supervision alarm when the busy-hour congestion network average is reached in the route. The traffic demand will be the same or greater, even if the number of route circuits in service decreases. The table of Erlang loss formula used for dimensioning the routes is also used, with the degree of congestion equal to the network average busy-hour congestion, to obtain the number of circuits which must be in service in order to maintain the service degree at the network busy-hour average level. The difference between the number of devices in the route and the minimum of number of devices needed for acceptable network service, provides the limit value blocking parameter value for the setting of the blocking supervision alarm. This avoids the spending of unnecessary maintenance hours repairing blocking alarms in a particular exchange if the maintenance does not produce a total network performance improvement. Once the average congestion of the network has decreased, the blocking values are reconsidered.

Figure 8:
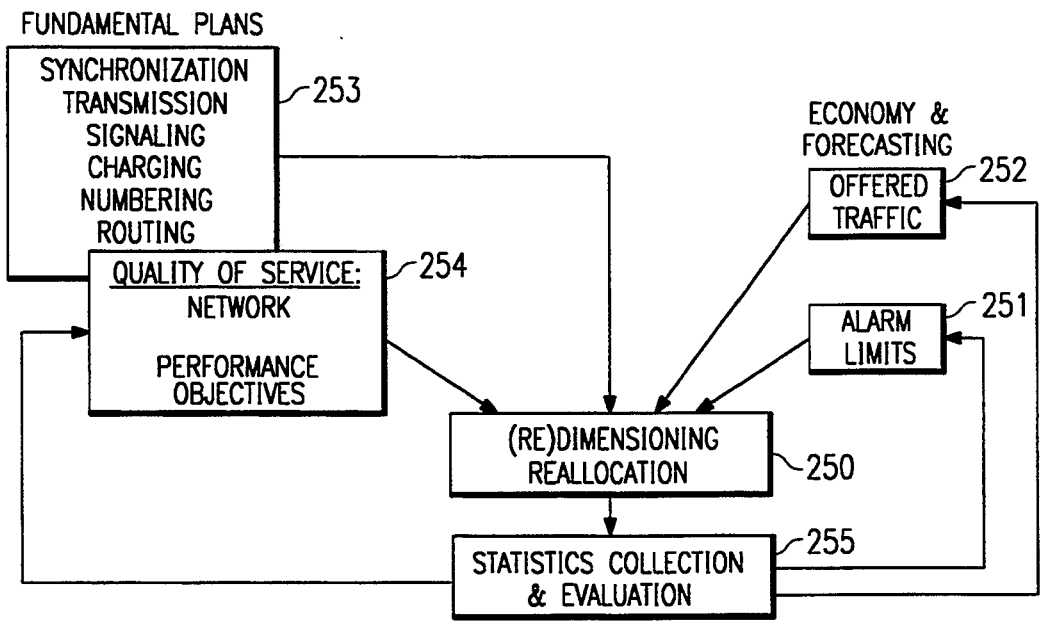
FIG. 8 is a chart illustrating certain input and control aspects of the system of the present invention.

Referring briefly to FIG. 8, there is shown a chart depicting an overview of the redimensioning events within the system of the present invention. The redimensioning and reallocation of routes at 250 receives economy and forecasting information in the form of alarm limits 251 and offered traffic 252 data. Similarly, the fundamental plans of synchronization, transmission, signaling, charging, numbering and routing at 253 influence the redimensioning and reallocation of routes 250. In addition, the quality of service and network performance objectives at 254 also contribute to the redimensioning reallocation 250. The result of the redimensioning goes into the statistics collection and evaluation subsystem 255 which in turn provides continuous feedback to the other elements 251–254.

Figure 10:
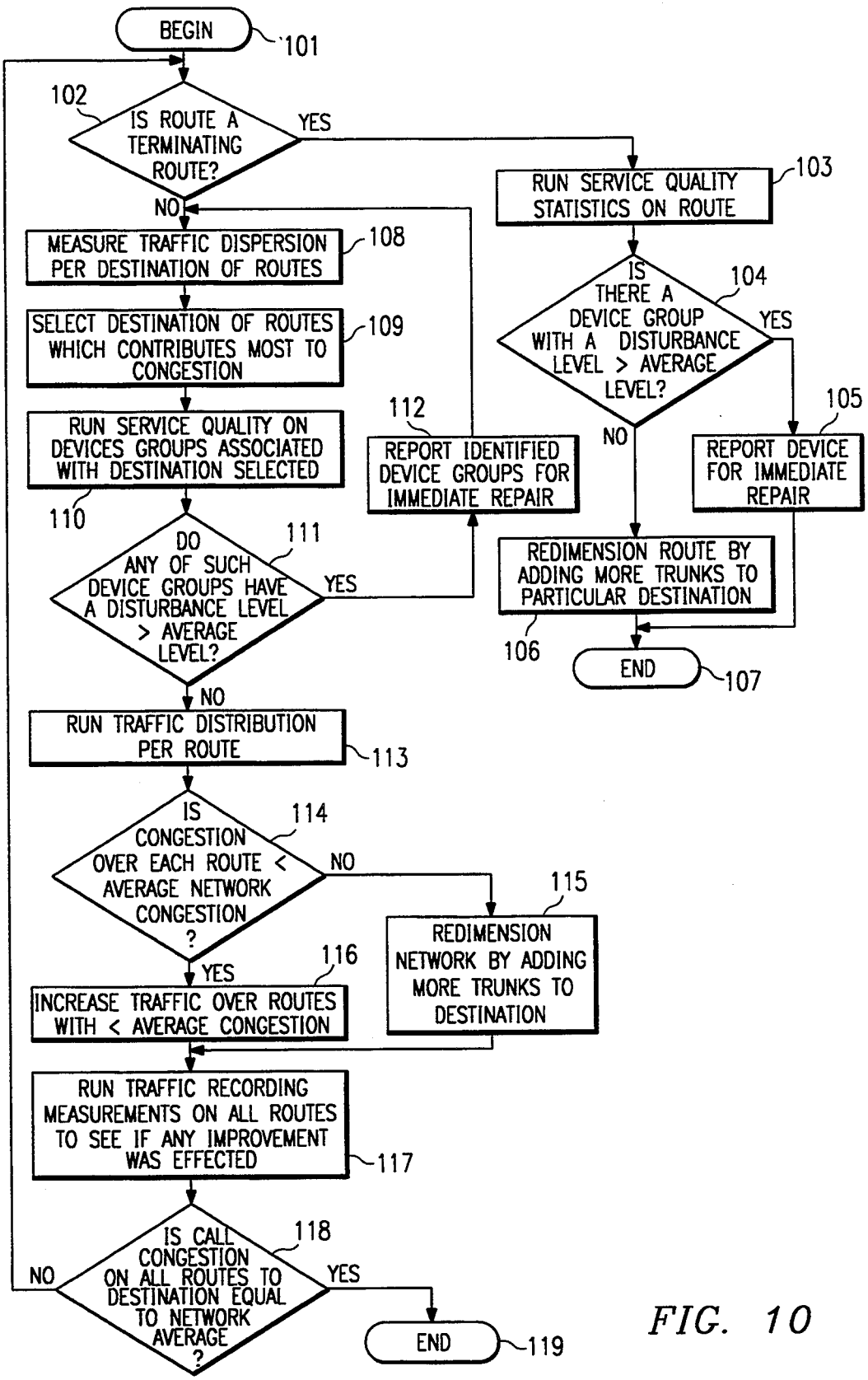
FIG. 10 is a flow chart illustrating the fine congestion tuning of last-choice routes in accordance with the system of the present invention.
Figure 16:
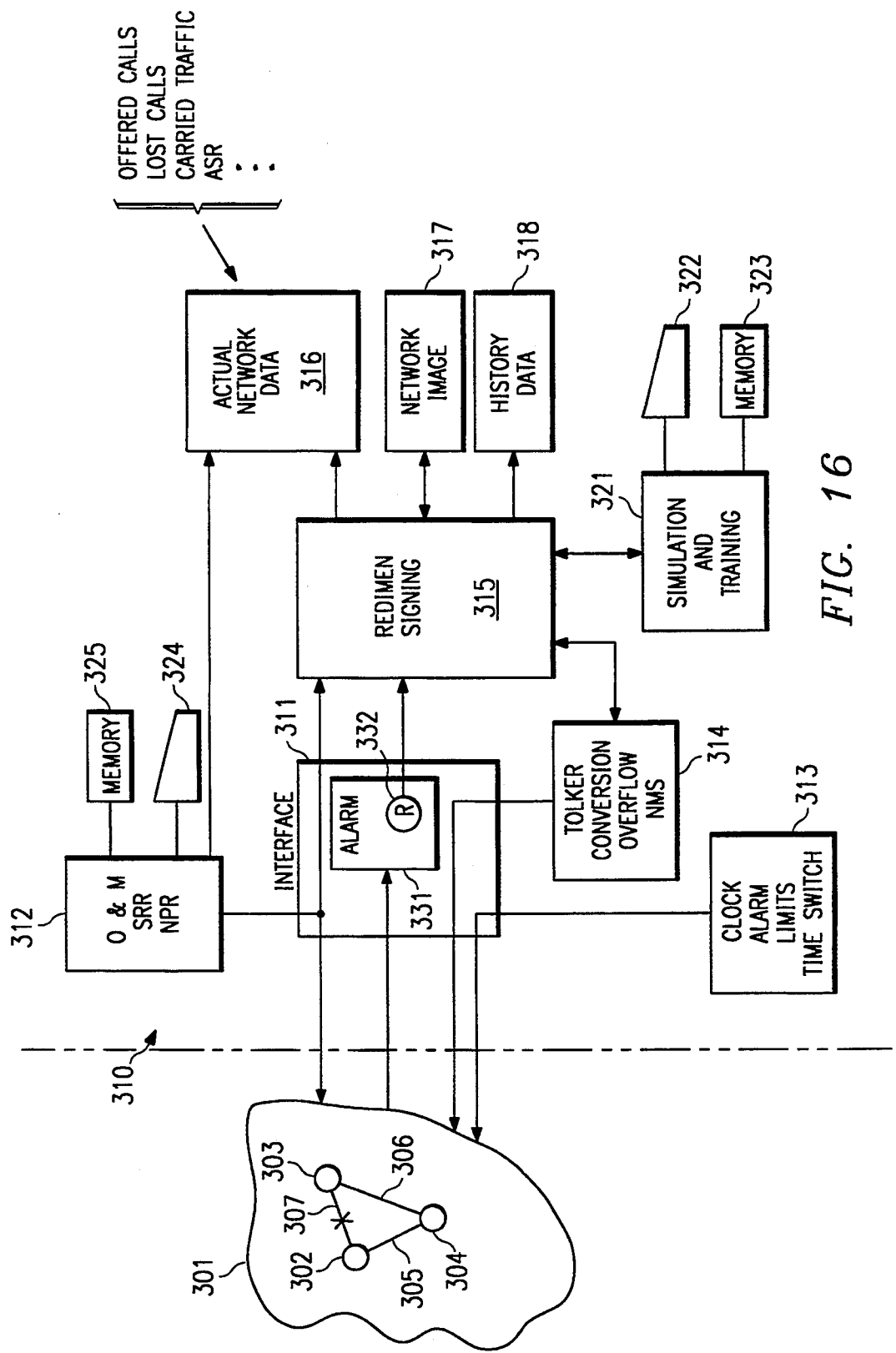
FIG. 16 is a block diagram of an automatic network congestion control system constructed in accordance with another aspect of the present invention.

Referring next to FIG. 10, there is shown a flow chart of the method used in one aspect of the system of the present invention in tuning manually at first the congestion of a network and then connecting it to automatic control in accordance with the systems shown in FIG. 16. In the flow chart of FIG. 10, the focus is on last-choice routes within the network. Each individual last-choice route in which the call congestion is greater than the average call congestion in the network is evaluated in accordance with the system of the present invention. The procedure begins at 101 and at 102 asks whether or not the route being evaluated is a terminating route, i.e., is that route going to end in the area of the destination. If so, the system moves to 103 and runs service quality statistics on the route. Thereafter, at 104, it asks whether there is a device group within the route with a disturbance level greater than the average level. If so, the system moves to 105 and immediately reports it for repair. If not, the system moves to 106 and redimensions the route by adding more trunks to that particular destination, thereafter ending at 107.

If at 102 the route is not a terminating route, then the system moves to 108 and measures the traffic dispersion per destination of the route as illustrated in FIG. 5C. Next at 109, it selects the destination of the route which contributes most to the congestion within the route. At 110 the system runs service quality statistics on device groups associated with the selected destination. At 111 it asks whether or not any such device groups have a disturbance level which is greater than the average disturbance level. If yes, at 112 the system reports it for immediate repair and returns to the measurement of traffic dispersion per destination at 108. If the answer is negative at 111, then the system runs traffic distribution measurement per route as illustrated in FIG. 5B at 113. At 114 it asks whether the congestion over each route is less than the average congestion within the network. If not, the system redimensions the network by adding more trunks to the destination at 115. If at 114 the congestion over each route is less than the average network congestion, the system increases the traffic over the routes with less than the average congestion which can reach the congested destination at 116 and then at 117 runs traffic recording measurements on all routes to see if any improvement was effected. Next, at 118, the system determines whether call congestion on all routes to the destination is equal to the network average. If yes, the coarse or manual phase of congestion adjustment based upon traffic measurements and statistics is completed and the procedure is switched to automatic congestion tuning in accordance with the system shown in FIG. 16. If no, the system returns to 101 and again cycles through the last-choice route being examined from the top.

The procedures of FIG. 10 are applied to each of the last-choice routes within the network in which the call congestion is greater than the average value of the network level. This enables the reconfiguration of calls within those routes in order to try and bring the call congestion on all routes within the network to equal the average congestion on all routes within the network. This procedure enables a coarse optimization of call congestion within the routes of the network and the maximization of revenue from the network based upon traffic measurements and statistics and the congestion tuning procedure is switched to automatic in accordance with the system shown in FIG. 16.

Figure 11:
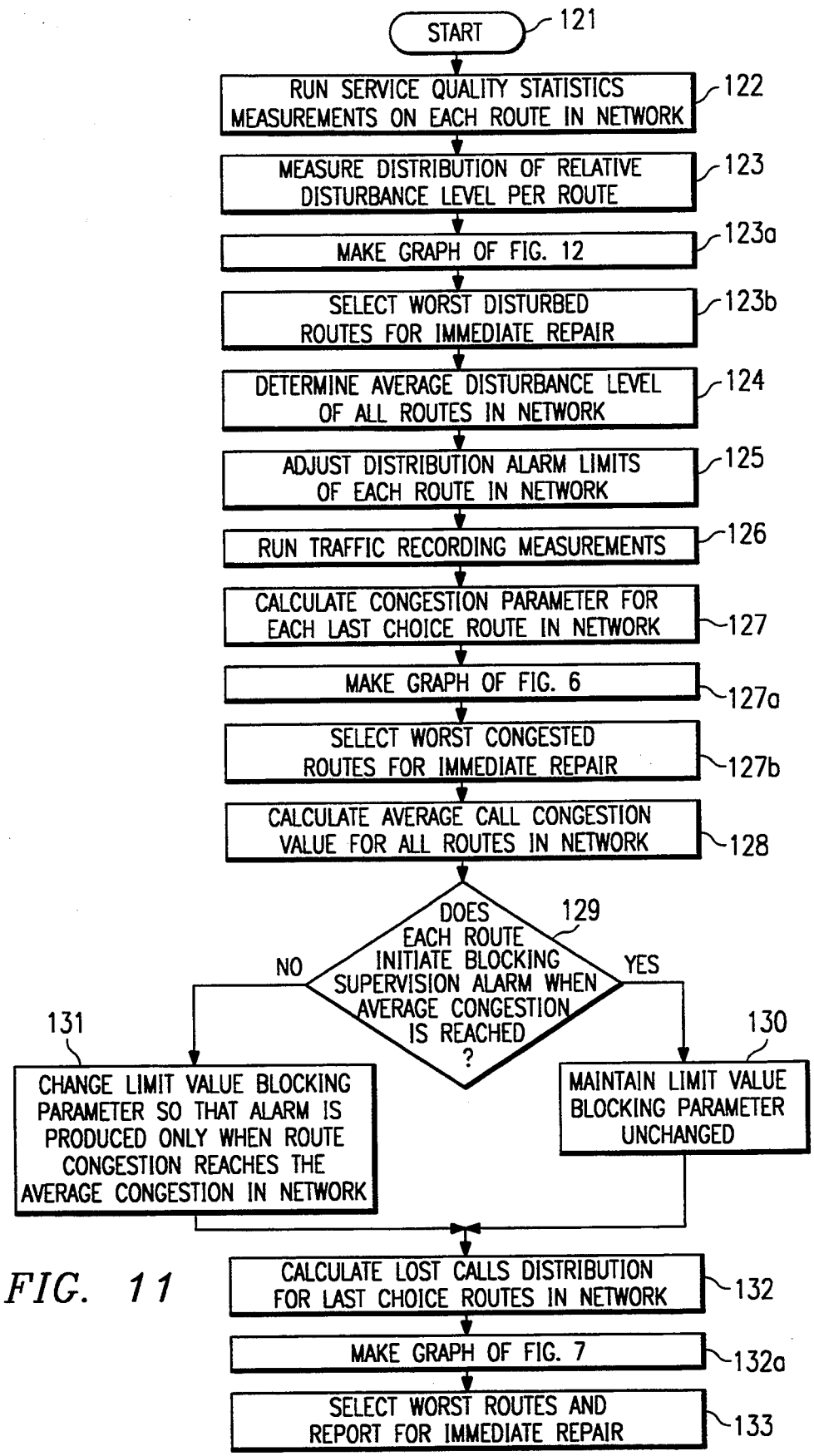
FIG. 11 is a flow chart illustrating the fine congestion tuning of network areas in accordance with the system of the present invention.

Referring next to FIG. 11, there is shown a flow chart of the procedure which is applied to each network level within the network, the performance of which is being optimized in accordance with the system of the present invention. Initially, the procedure starts at 121 and at 122 the system runs service quality statistics measurements on each route within the network. Next, at 123, the system measures the distribution of relative disturbance levels per route within the network, prepares the graph illustrated in FIG. 12 at 123a, selects the most disturbed routes for immediate repair at 123b, and moves to 124 at which it determine the average disturbance level on all routes within the network. At 125, it adjusts the disturbance alarm limits of each route within the network so that no alarms are produced unless the limit exceeds the average disturbance level within the network. Next, at 126, the system runs traffic recording measurements within the network and then at 127, calculates congestion parameters for each last-choice route within the network prepares the graph illustrated in FIG. 6 at 127a, and selects the most congested routes for immediate corrective action at 127b. At 128 the system calculates the average call congestion value for all routes in the network and moves to 129 at which it determines whether each route initiates a blocking supervision alarm when the average congestion value within the network is reached within that route. If yes at 129, the system moves to 130, at which it maintains the limit value blocking parameter unchanged within the route. If no at 129, the system moves to 131, at which it changes the limit value blocking parameter so that an alarm is produced only when the route congestion reaches the average congestion within the network. Following either 130 or 131, the system moves to 132 at which it calculates lost call distribution for the last-choice routes within the network, prepares the graph illustrated in FIG. 7 at 132a and, thereafter, moves to 133 at which it selects the worst routes within the network and reports them for immediate corrective action.

As can be seen, the procedures of FIG. 11 allow the adjustment of the alarm limits within the exchanges of the network to permit alarms to occur as long as the presence of the alarms, such as disturbance alarms, does not exceed the average alarm level within the network.

Referring again to FIG. 12, there is shown a chart of the distribution of the relative disturbance level per route during the busy-hour illustrating that the average disturbance level within all of the last-choice routes of the network should preferably be no greater than a selected percentage higher than network average. When the disturbance level on a route is higher than the allowed percentage above the network average, those routes will be identified and immediately reported for repair in accordance with the cutting of the most deficient parts within the network. Once the above procedures have been performed, the coarse congestion tuning has been completed and the system moves to fine congestion tuning in accordance with the automatic system illustrated in FIG. 16.

Figure 13:
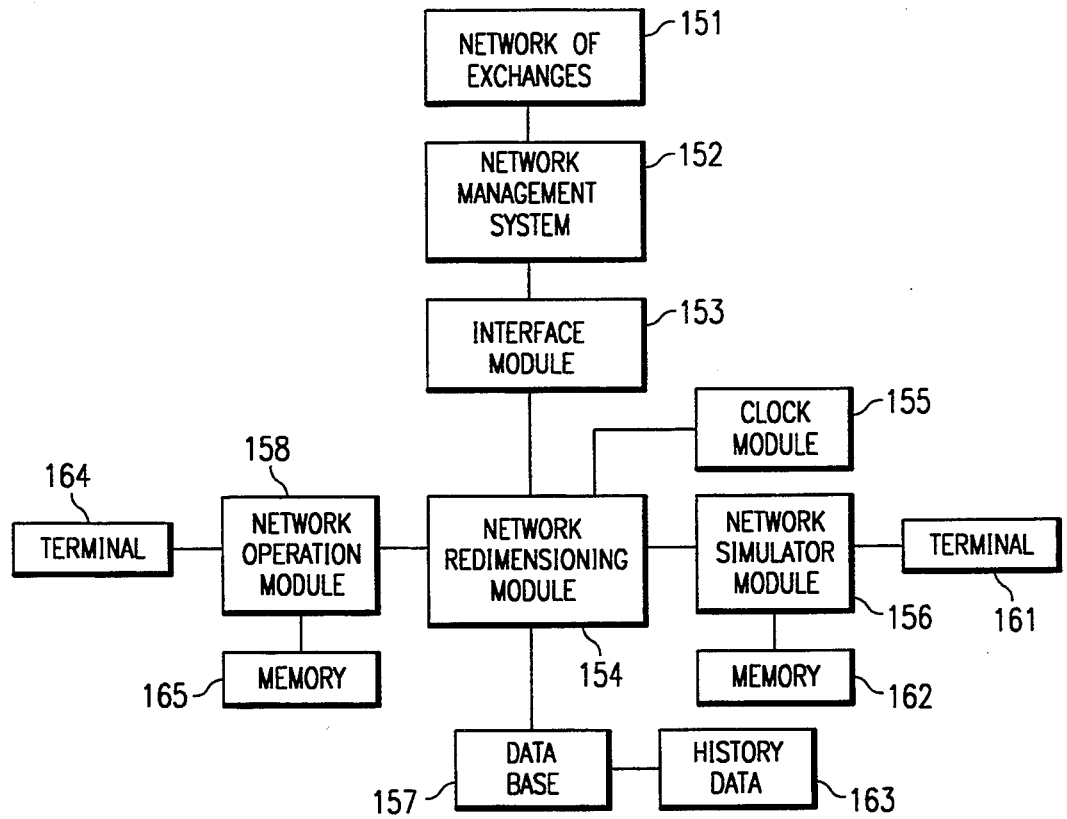
FIG. 13 is a block diagram of an automatic network congestion control system constructed in accordance with one aspect of the system of the present invention.

Referring next to FIG. 13, there is shown a block diagram of an automated system for reconfiguring the exchanges and their interconnections within the network in order to further implement the procedures of another aspect of the present invention, As shown in FIG. 13, a network of exchanges 151 is connected through a network management system 152 via an interface module 153 to a network redimensioning module 154. The network redimensioning module 154 is connected to a clock module 155, a network simulator module for hypothetical study of the network reactions 156, a database 157 and a network operation module 158. The network simulator module 156 is coupled to both a terminal 161 for the input and output of data and to a memory 162 for the storage of data used by the network simulator module. The database 157 also includes a history data module 163. The network operation module 158 similarly includes a terminal 164 for the input and output of data and a memory 165 for the storage of data.

The network operation module 158 handles the operation and maintenance menus for the switch reliability review and network reliability review methods of the network maintenance systems as described above, especially in connection with FIGS. 10 and 11. This makes it possible to compile a top ten network deficiency list comprising a dynamic list which is periodically updated and contains a combination of traffic and technical corrective measures. Once the coarse congestion tuning is accomplished, the system is switched to automatic tuning in accordance with the components shown in FIG. 16. The module also contains a real time slope presentation of parameters such as offered calls, lost calls, successful calls, repeated calls and carried traffic.

The network redimensioning module 154 is based upon the standard network route dimensioning and optimization programs used in conventional SPC exchanges, such as the "LUNA" program used in the AXE exchanges, to decide upon and specify the number and configuration of circuits and routes based upon traffic requirements as referred to above. Such programs are normally loaded with anticipated traffic data such as traffic interest, number of subscribers and traffic load and produce a determination of where it is best to locate proposed new exchanges, the size of such exchanges and the configuration of the routes therebetween. In the present application, these programs are used in the opposite way to take a given amount of traffic and resources and determine the amount of traffic which can be carried. In a major fault situation involving loss of an exchange or a route, as illustrated at 331 in FIG. 16, alarm data is received and a parameter R (a faulty route name) indicates which network portion is out of order, as illustrated at 332 in FIG. 16. The fault situation can also be an overloaded route, low answer seizure ratio, all circuits busy and other conditions. The network is then redimensioned in order to decide what is the maximum traffic which can be carried at that particular moment within the network at a given grade of service (congestion level). Records indicating traffic history data, data related to the time of the day and the season of the year are also stored within the database (157 in FIG. 13 and 318 in FIG. 16) to provide information for the network redimensioning module. Overflow of the network is converted to the network management system control function commands for each exchange which enables a soft reconfiguration of the network in the most efficient manner by converting the overflow to commands which limit the originating traffic as close as possible to its origin. Alternatively, if the network is equipped with digital cross connect (DCC), a new connection may be established between the overloaded sources and destinations.

The network simulation module (156 in FIG. 13 and 321 in FIG. 16) enables the testing and evaluation of real time measures to bring technical help, including selection of the most suitable real time measures for each exchange. For example, if call gap restrictions are to be used before the restriction of accessible outgoing circuits, those conditions may be simulated in this module 156/321. This module 156/321 also permits evaluation of the efficiency of the recommended network management functions. The network simulation module 156 allows an event network hypothetical or "what if" simulation according to situations described in an off-line scenario for each exchange. It also allows a simulation of the switch parameter function results, for example, between an origin and a destination. In addition, it allows the saving of results of a simulated scenario and the creation of a file for a simulated scenario, as well as the transfer of the redimensioning program into the network redimensioning module 154. The network simulation module 156 works interactively with the network redimensioning module 154 to present the traffic results and consequences of a simulated event. It also allows the simulation of a next event and adds the results to the file in a real time network management situation to simulate the results of the measures proposed before the actual actuation of those commands. Moreover, the system of FIG. 13 allows the automated implementation of the switch reliability review and network reliability review based network route congestion fine tuning procedures of the present invention discussed above.

Figure 14:
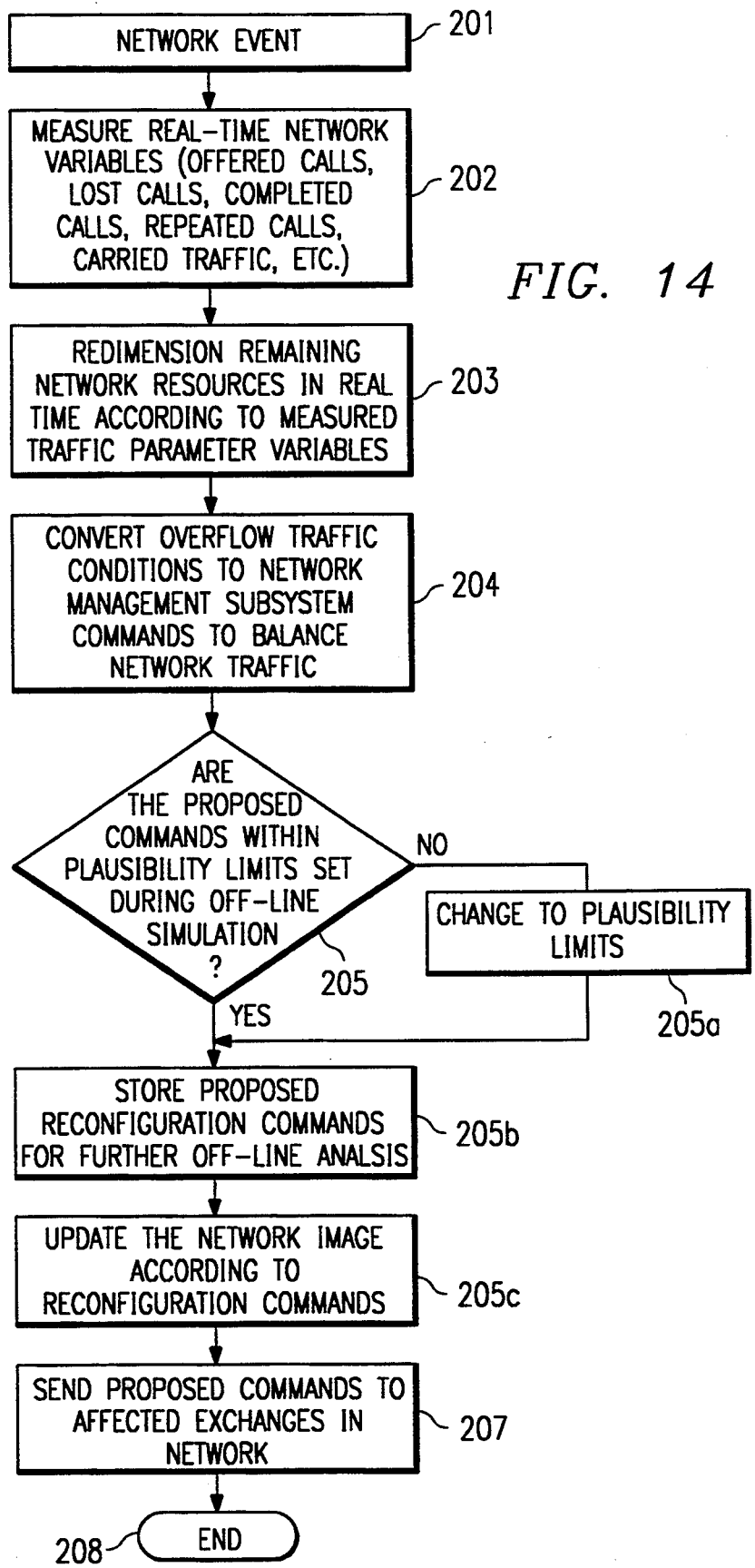
FIGS. 14 and 15 are flow charts illustrating processes of congestion tuning within a network in accordance with the present invention.

Referring now to the flow chart of FIG. 14, it can be seen how certain aspects of the system of FIG. 13 are implemented. At 201 a network event starts and at 202 the system measures the real time network variables such as offered calls, lost calls, completed calls, repeated calls, carried traffic, etc. It should be noted that a "network event" can be either negative or positive, i.e., either a deterioration or improvement. For example, an alarm can be seized as an indication that a threshold value of a parameter has been reached on either a positive or negative direction. When the network event is associated with a deterioration, redimensioning is done at a higher grade of service. When the event is associated with an improvement, the redimensioning is done at a lower grade of service and the network is restored when the situation returns to normal. In either case, at 203 the system redimensions the remaining network resources in real time at a higher grade of service if the network event is a deterioration or lower grade of service of the event is an improvement in accordance with standard network dimensioning programs and according to the instant measured traffic parameter variables. At 204 the system converts traffic conditions when the network event is a deterioration/improvement to network management subsystem commands to control the affected exchanges and balance, i.e., optimize, the network traffic. At 205 the system checks the plausibility of the proposed commands with stored advance set limits based upon off-line simulated events. If necessary, the proposed commands are changed to plausibility limits at 205a and the system stores the proposed network reconfiguration commands at 205b, for example in a device such as memory 323 of FIG. 16, for later analysis in relation to the network reaction. At 205c, the system updates the network image in accordance with the reconfiguration commands and sends them at 207 to affected exchanges in the network before ending at 208.

Figure 15:
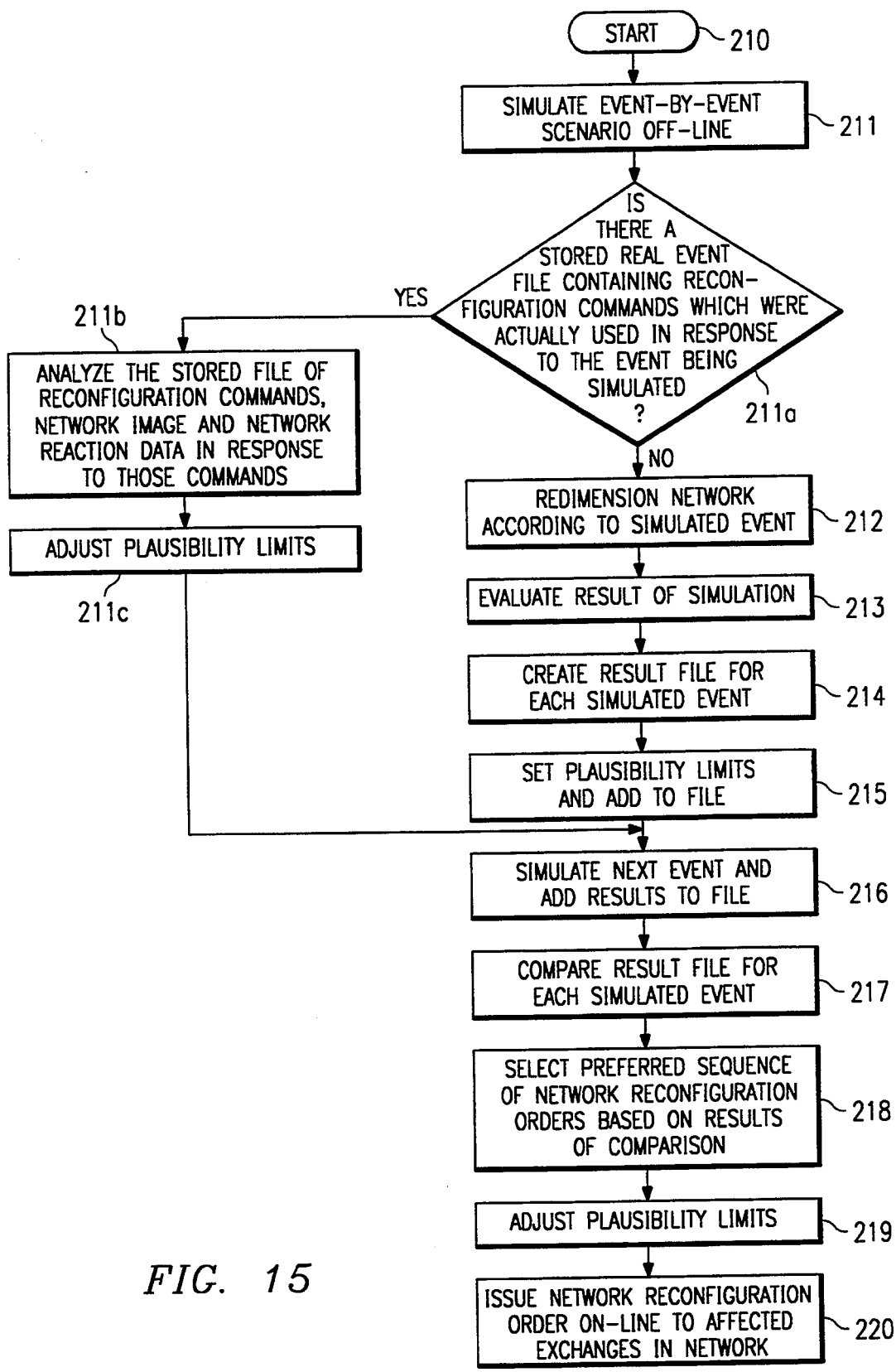

Referring now to the flow chart of FIG. 15, the simulation of events start at 210 and at 211 the system simulates the event-by-event scenario off-line, particularly within the network simulator module 156 of FIG. 13 (or 321 of FIG. 16). At 211a, the system determines whether or not there is a stored real event file containing reconfiguration commands which were actually used in response to an event of the same kind being simulated. If so, the system moves to 211b and performs an analysis of the following data: (1) the reconfiguration commands issued in response to the event which occurred (stored, e.g., in memory 323 of FIG. 16); (2) the network image after redimensioning and issuance of proposed commands (stored, e.g., in memory 317 of FIG. 16); and (3) the network reaction data after issuance of the proposed commands (stored, e.g., in memory 316 of FIG. 16). At 211c, the system adjusts the plausibility limits associated with this reconfiguration decision. If the answer was no at 211a, the system performs an off-line redimensioning of the network according to the simulated event at 212 and evaluates the results of the simulation at 213. At 214, the system creates a result file for each simulated event and then moves to 215 where it sets the plausibility limits on the network parameters associated with this redimensioning. It then moves to 216 where it simulates the next event, adds the results to the file created at 214 and again sets plausibility limits at 215. At 217 the system compares the result file for each simulated event and at 217 selects the preferred sequence of network reconfiguration orders based upon the results of the comparison at 217. At 219, the system performs another off line redimensioning of the network and checks the plausibility limits of the parameters on the proposed reconfiguration to determine the optimum reconfiguration under these conditions. Finally, at 220, the system issues network reconfiguration orders on-line to effected network exchanges within the network.

In FIG. 15, there is shown a flow chart illustrating the manner in which the expert system incorporated into the network simulation model heuristically accumulates experience for use in real time reconfiguration of a network in an efficient manner. For example, when the system of FIG. 16 is placed into a new market, when a new exchange is proposed for the network, or when a new exchange is actually introduced into the network, various potential network events, such as the loss of an exchange, are simulated off-line. A simulated redimensioning of the network in response to the event is performed and placed into a file. Analogies to the previous system configuration are then calculated in order to compute plausibility limits on the network parameters associated with this reconfiguration decision. When the previously simulated event of a loss of an exchange actually occurs later on, the system will recognize the occurrence of this event because it will receive similar network information and alarms. The system then initiates an off-line redimensioning of the network and does a plausibility check of its decision by comparing it to the previously set limits resulting from the previous simulation and determines the optimum reconfiguration for the network under specific conditions. This optimum redimensioning (or reconfiguration) is then implemented on-line. The system will then readjust the plausibility limits accordingly and store these data into the event file. The result of this procedure is that the system learns heuristically; as more events occur, the better the plausibility limits will become, and thus the system will compute better and better reconfigurations of the network than those previously computed.

Referring to FIG. 16, there is shown a block diagram of another embodiment of an automated system for reconfiguring the exchanges and their interconnections within the network in order to implement an automatic real-time reconfiguration aspect of the invention. A network 301 includes exchanges 302, 303 and 304 which are interconnected with one another by means of routes 305, 306 and 307. The exchanges 302–303 of the network 301 are connected to a network management and control system 310 through an interface module 311. The interface module 311 serves to couple to the network an operation and maintenance module 312, a clock module 313, a command conversion module 314 and a redimensioning module 315. Connected to the redimensioning module 315 are several memory modules, one for actual network data 316, one for network image 317, and one for historical data 318. A simulation and training module 321 is also connected to the redimensioning module 315 and includes an input device 322 and a memory 323.

The interface module 311 operates on interrupt principles by assigning different levels of priority to various events, such as, loss of an exchange (highest priority), route alarms, operator intervention, and other network parameters generated by the network management subsystem, e.g., answer seizure ratio, percentage of overflow, all circuits busy, etc. The interface module serves not only to couple signals into and out of the network 301 but also to analyze network alarms and operating conditions and supply information to other parts of the system.

The operation and maintenance module 312, which includes an input terminal 324 and a memory 325, performs periodic operation and maintenance reviews of the functioning of the network including switch reliability reviews (SRR) and network performance reviews (NPR) which make it possible to compile the top ten deficiency lists as discussed above. This module implements the traffic and technical corrective measures to the network to perform fine congestion tuning of the network as described above in connection with another aspect of the present invention. The clock module 313 monitors the time parameters related to traffic within the network and includes the capability of changing the various classes and levels of the alarms within the network as a function of the traffic profile history data. The clock module includes a history data base of traffic profile for each exchange in the network as a function of both the season and time of day. It also includes data on all time based pre-planned routing changes. This module directly controls the switches in the network to change the alarm limits based upon time differences within the network. For example, for the time period during which the route from Stockholm to Sidney is in a busy hour mode, the system may increase the importance of the alarm on that route because of the enhanced economic significance of any interruption to those circuits during that period. It also allows reassignment of routes and circuits within the network to take advantage of excess circuit capacity in certain routes during their least occupied periods.

The command conversion module 314 converts the overflow traffic values obtained from the redimensioning module 315 to network management subsystem commands in order to limit the traffic which cannot be carried at the affected exchanges at that particular time. Such overflow traffic, for example, due to loss of an exchange, low answer/seizure ratio or exaggerated increase in traffic interest to a particular destination, will be limited as close as possible to its origin by the commands sent from the command conversion module 314.

The operation of the remainder of the system 310 will be illustrated by assuming that the route 307 is lost in the network 301 and detected at 331 by an interrupt within the interface module 311. The name of the route "R" which has been lost is indicated at 332 and sent to the redimensioning module 315 which then eliminates that route as a resource within the network. The module 315 then redimensions the remainder of the network to determine whether the existing traffic taken from 316 can be carried by the existing resources. If we further assume that the remaining resources of the network cannot carry the existing traffic load without the lost route, the redimensioning module determines the amount of traffic overflow (by redimensioning at a higher grade of service) and sends that determination to the command conversion module 314. As discussed above, this module converts this overflow information to commands to the individual exchanges of the network to limit the originating traffic as close as possible to its origin to give all routes busy tones and/or recorded announcements to avoid overloading the routes of the network with calls which cannot be completed due to lack of resources.

In determining whether the network has sufficient resources for existing traffic, the redimensioning module 315 may make use of existing network optimization programs, as discussed above. In order to perform these functions the redimensioning module 315 uses actual network data from memory module 316 within which is stored measured traffic data such the number of offered calls, number of lost calls, carried traffic, answer/seizure ratio (ASR), etc. Such data may be in the form of a graphic representation of the actual traffic configurations showing a slope for each of the measured parameters. The redimensioning module 315 also uses information from the network image module 317 which contains data related to the particular configuration, such as, the number of exchanges, the number of routes, the size of the routes, the maximum number of subscribers connected to each exchange, the type of signaling in use, destination of routes, etc. The information stored in the history data module 318, and used by the redimensioning module 315, relates to the historically normal traffic for that particular region and for particular times of the year and times of the day.

The simulation and training module 321 makes it possible to test the system and obtain information about how the network would react under various types of operating conditions and alarms. It enables communication with the redimensioning module 315 in an off-line mode to evaluate the decisions taken in previous scenarios and determine whether there are better solutions which may be implemented in the event the same events occur again.

Figure 17:
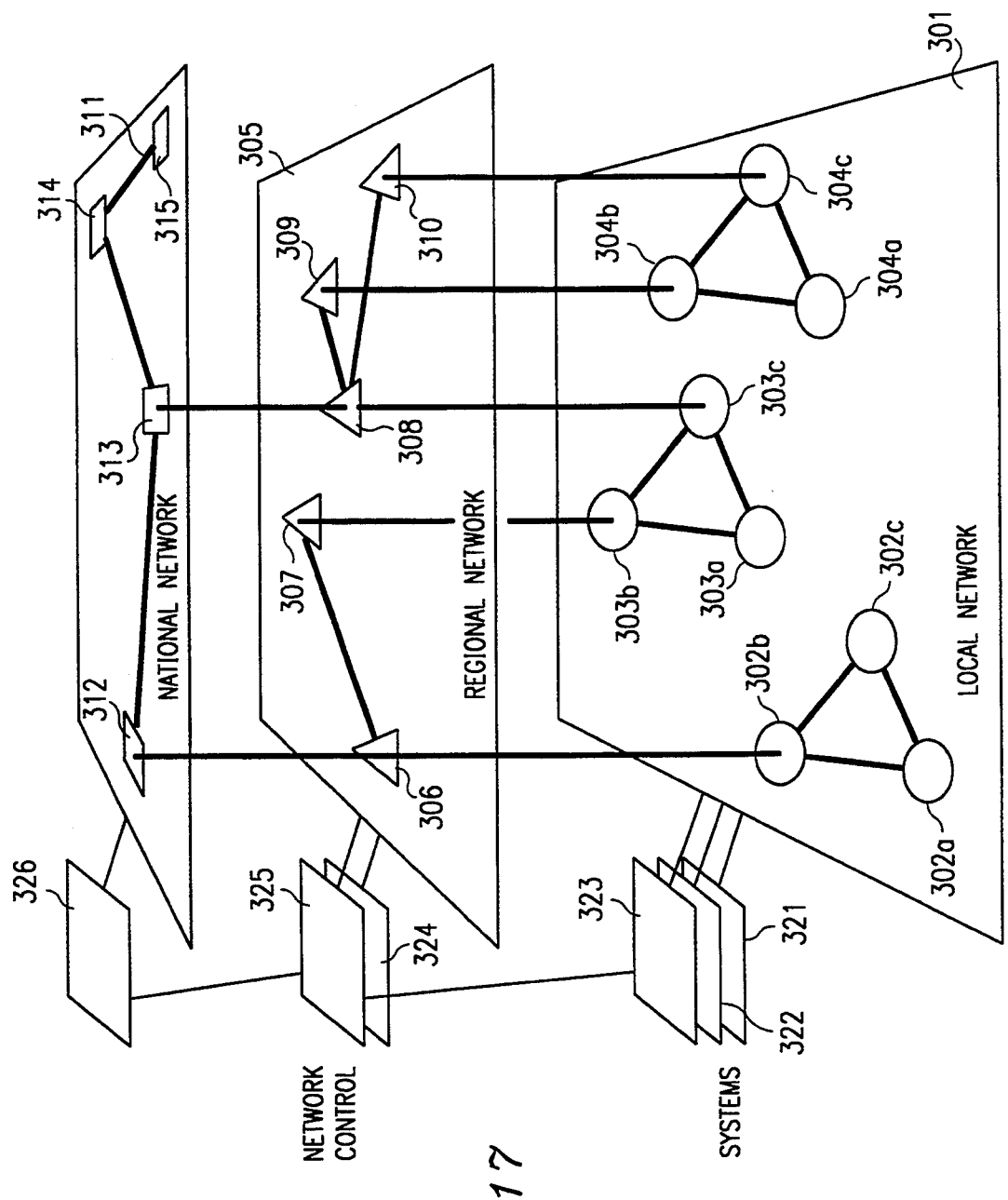
FIG. 17 is an illustrative diagram of a hierarchial implementation of an automatic network congestion control system constructed in accordance with the present invention.

Referring finally to FIG. 17, there is shown an illustrative diagram of a hierarchical implementation of an automatic network congestion control system constructed in accordance with the present invention. In FIG. 17, there is shown a first plane 301 representing the local network comprising a plurality of local exchanges such as 302a–302c, 303a–303c and 304a–304c, each group of which could represent local exchanges within a single geographic area code. For example, local exchanges 302a–302c could be within the New York area code of 212; exchanges 303a–303c could be within the Washington, D.C. area code of 202; and exchanges 304a–304c could be local exchanges within the Dallas area code of 214. The second plane 305 represents a regional network level and could include transit exchanges 306–310 each of which might be located in a separate geographic region and be connected to the different local exchanges to provide interconnection routes between them. Finally, the third plane 311 represents a national network level and could include international transit exchanges 312–315 which might be located in various geographic regions and connected to couple the various regional transit exchanges 306–310 to international transit exchanges located in different countries of the world.

The network control systems 321–323 might be associated respectively with each of the local network exchanges 302a–302c, 303a–303c, and 304a–304c, respectively, for controlling the configuration of those local networks in accordance with the principles of the present invention as described above. Similarly, the network control systems 324–325 might be associated with regional transit exchanges 306 & 307, and 308–310, respectively, and control the congestion of the networks on those levels with the network control system 326 associated with the national network level transit exchanges 312–315 to control the network congestion on that level. Each of the network congestion control systems 321–326 might consist of a system such as that shown and described above in connection with FIGS. 13 and/or 16. Thus, it can be seen by the example of FIG. 17 that congestion control can be implemented in accordance with the system of the present invention at various levels in a network and in various combinations within each of a plurality of different levels of a network.

As can be seen from the above, the system of the present-invention enables the fine congestion tuning of a network in a highly efficient manner. This enables the operation of the network at the optimum efficiency for maximum return to the administration responsible for the network.

It is thus believed that the operation and construction of the present invention will be apparent from the foregoing description. While the method, apparatus and system shown and described has been characterized as being preferred, it will be obvious that various changes and modifications can be made therein without departing from the spirit and scope of the invention as defined in the following claims.

What is claimed is:

1. In a telecommunications network including a plurality of exchanges interconnected by telecommunications routes, each of said routes having a plurality of trunks containing a plurality of circuits, a method of reconfiguring said network to improve its traffic carrying capacity comprising the steps of:

determining last-choice routes within said telecommunications network;

measuring busy hour call congestion and number of call bids of said last-choice routes within said network;

calculating a busy hour call congestion percentage for said last-choice routes;

calculating a busy hour lost calls number for each of said last-choice routes;

selecting all last-choice routes which have a busy hour lost calls number greater than a preselected value;

identifying all selected last-choice routes which terminate in a contiguous exchange;

measuring disturbance levels on all of said trunks in the identified selected last-choice routes;

calculating an average measured disturbance level of all trunks in the identified selected last-choice routes;

reporting for service all trunks which have a disturbance level greater than said calculated average measured disturbance level;

measuring traffic dispersion on each of said selected last-choice routes which were not identified as terminating in a contiguous exchange;

determining, for each of said selected last-choice routes which were not identified, which destination contributes most to congestion of said selected last-choice route which was not identified;

measuring disturbance levels of all of said trunks in each of said last-choice routes which lead to said determined destination;

calculating an average measured disturbance level of all trunks leading to said determined destination;

reporting for service all trunks leading to said determined destination which have a disturbance level greater than said average measured disturbance level;

measuring traffic distribution on each of said selected last-choice routes which lead to said determined destination;

calculating an average call congestion level on each of said selected last-choice routes;

increasing the traffic to said determined destination along each of said selected last-choice routes which has a measured call congestion level less than said average call congestion level;

adding additional capacity to said determined destination along each of said selected last-choice routes which has a measured call congestion level greater than said average call congestion level;

determining for each of said selected last-choice routes, whether said additional capacity was sufficient to reduce the measured call congestion level to said average call congestion level; and instituting call restriction procedures in each exchange along said selected last-choice routes in which said additional capacity was not sufficient to reduce the measured call congestion level to said average call congestion level.

2. In a telecommunications network including a plurality of exchanges interconnected by telecommunications routes, each of said routes having a plurality of trunks containing a plurality of circuits, the method of reconfiguring said network to improve its traffic carrying capacity as set forth in claim 1 in which said additional capacity is added by means of a digital cross connect system within said exchanges.

3. In a telecommunications network including a plurality of exchanges interconnected by telecommunications routes, each of said routes having a plurality of trunks containing a plurality of circuits, the method of reconfiguring said network to improve its traffic carrying capacity as set forth in claim 1 further comprising the steps of:

measuring traffic distribution on each of said selected last-choice routes which lead to said determined destination;

recalculating the average call congestion level on each of said selected last-choice routes; and determining whether the measured call congestion level on all selected last-choice routes is greater than said average call congestion level.

4. A flexibly configurable telecommunications network including a plurality of exchanges interconnected by telecommunications routes, each of said routes having a plurality of trunks containing a plurality of circuits for carrying telecommunications information from one exchange to another, and a network management system for controlling the exchanges and trunks within said network to select which trunks are used to carry telecommunications information from one exchange to another and, thereby, optimize the routing of telecommunications information with the network as a function of date and time, said network comprising:

a network redimensioning module for generating control signals for communications with said network management system and directing said system to select certain trunks for the routing of telecommunications information between certain exchanges and thereby configure said network as a function of date and time;

an interface module connecting said redimensioning module and said network management system;

a clock module connected to said redimensioning module to cause said redimensioning module to select appropriate trunks for the routing of information between exchange for different dates and times;

a network simulator module connected to said redimensioning module for simulating a plurality of different performance characteristics of said network, including congestion of routes between exchanges, said simulator module also including, an operator terminal for inputting telecommunications traffic simulation data and outputting network performance characteristics data from said simulator module, and a memory for storing data files containing associated sets of simulated control signals and network performance characteristic results obtained in response thereto from said simulator module;

a data base memory connected to said redimensioning module for storing control and performance information related to the network; and a network operation module connected to said redimensioning module for controlling signals from said redimensioning module to said network through said interface module and enabling said redimensioning module to implement trunk routing configurations within said network which have demonstrated desirable simulated network performance characteristics for simulated traffic conditions comparable to those being experienced within the network, said operation module also including, an operator terminal for inputting network operation control data and outputting network operation and performance data from said network operation module, and a memory for storing actual network operation data files including network performance characteristics.

5. A method of providing improved performance of a telecommunications network by optimizing the network's traffic carrying capacity, said network having a plurality of exchanges and a plurality of routes connecting those exchanges to one another with each of said routes being capable of carrying traffic between said exchanges within the network, said method comprising the steps of:

measuring congestion levels within the traffic being carried by each route within the network;

calculating an average value of congestion within the traffic throughout all of the routes between the exchanges in the network; and redimensioning the network by rerouting and limiting the traffic within the routes between the exchanges in the network to bring the congestion levels within the traffic on each route between each exchange approximately equal to the average value of congestion within the traffic throughout all of the routes between the exchange in the network, wherein said step of limiting the traffic within the routes includes:

determining points of origin for the traffic on each of said routes; and limiting the traffic on each of said routes between the exchanges in the network as close to said points of origin as possible within the network by instituting call restriction procedures within each exchange having anticipated traffic in excess of that which would produce a congestion value in the exchange greater than the average congestion value within the network.

6. A method of optimizing a telecommunications network to which telecommunications traffic is being offered for improved traffic carrying capacity, said network having a plurality of exchanges and a plurality of routes connecting those exchanges to one another with each of said routes being capable of carrying traffic between said exchanges in the network, said method comprising the steps of:

calculating the traffic carrying capacity of the network for a selected degree of congestion within the network;

measuring the traffic being offered to the network;

comparing said calculated traffic carrying capacity to said measured traffic to determine a value of overflow traffic;

determining points of origin for the traffic on each of said routes; and limiting said overflow traffic as close to said points of origin thereof as possible within the network by instituting call restriction procedures within each exchange having overflow traffic, to reduce the measured traffic by the value of overflow traffic to achieve the calculated traffic carrying capacity for the selected degree of congestion within the network.

7. A method of optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said method comprising the steps of:

selecting a degree of congestion which is permitted within the network;

storing in memory, levels of traffic which have historically been carried by the network for particular days and hours;

redimensioning the network in response to detecting any change in the traffic carrying capacity of the network, said redimensioning being based upon existing traffic carrying resources following said change in the traffic carrying capacity of the network;

calculating a maximum traffic carrying capacity of said redimensioned network for said selected degree of congestion;

comparing the maximum traffic carrying capacity of said redimensioned network to said stored historical levels for said particular days and hours to obtain a difference therebetween as overflow traffic; determining points of origin for the traffic on each route; and limiting said overflow traffic as close as possible to said points of origin thereof within the network by instituting call restriction procedures within each exchange having overflow traffic, to reduce the calculated maximum traffic carrying capacity of said redimensioned network to equal said stored historical levels of traffic.

8. A method of optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said method comprising the steps of:

selecting a degree of congestion which is permitted within the network;

storing in memory, levels of traffic which have historically been carried by the network for particular days and hours;

redimensioning the network in response to detecting any change in the traffic carrying capacity of the network, said redimensioning being based upon existing traffic carrying resources following said change in the traffic carrying capacity of the network, wherein said redimensioning step includes the steps of:

selecting a computer program for dimensioning said network based upon anticipated traffic within the network and the traffic interests on said routes of the network;

inputting available resources of said network after a decrease in the traffic carrying capacity thereof into said program; and calculating the traffic carrying capacity of said network and the routes thereof with said program;

calculating a maximum traffic carrying capacity of said redimensioned network for said selected degree of congestion;

comparing the maximum traffic carrying capacity of said redimensioned network to said stored historical levels for said particular days and hours to obtain a difference therebetween as overflow traffic;

determining points of origin for the traffic on each route; and limiting said overflow traffic as close as possible to said points of origin thereof within the network.

9. A method of optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said method comprising the steps of:

selecting a degree of congestion which is permitted within the network;

storing in memory, levels of traffic which have historically been carried by the network for particular days and hours;

redimensioning the network in response to detecting any change in the traffic carrying capacity of the network, said redimensioning being based upon existing traffic carrying resources following said change in the traffic carrying capacity of the network;

calculating a maximum traffic carrying capacity of said redimensioned network for said selected degree of congestion;

comparing the maximum traffic carrying capacity of said redimensioned network to said stored historical levels for said particular days and hours to obtain a difference therebetween as overflow traffic;

determining points of origin for the traffic on each route; and limiting said overflow traffic as close as possible to said points of origin thereof within the network by instituting traffic management control function procedures within each exchange having anticipated traffic in excess of its historical traffic level for the selected permitted degree of congestion.

10. A method of optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said method comprising the steps of:

selecting a degree of congestion which is permitted within the network;

storing in memory, levels of traffic which have historically been carried by the network for particular days and hours;

redimensioning the network in response to detecting any change in the traffic carrying capacity of the network, said redimensioning being based upon existing traffic carrying resources following said change in the traffic carrying capacity of the network;

calculating a maximum traffic carrying capacity of said redimensioned network for said selected degree of congestion;

comparing the maximum traffic carrying capacity of said redimensioned network to said stored historical levels for said particular days and hours to obtain a difference therebetween as overflow traffic;

determining points of origin for the traffic on each route; and limiting said overflow traffic as close as possible to said points of origin thereof within the network by instituting call restriction procedures within each exchange having anticipated traffic in excess of its historical traffic level for the selected permitted degree of congestion.

11. A method of optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said method comprising the steps of:

selecting a degree of congestion which is permitted within the network;

storing in memory, levels of traffic which have historically been carried by the network for particular days and hours;

redimensioning the network in response to detecting any change in the traffic carrying capacity of the network, said redimensioning being based upon existing traffic carrying resources following said change in the traffic carrying capacity of the network;

calculating a maximum traffic carrying capacity of said redimensioned network for said selected degree of congestion;

comparing the maximum traffic carrying capacity of said redimensioned network to said stored historical levels for said particular days and hours to obtain a difference therebetween as overflow traffic;

determining points of origin for the traffic on each route; and limiting said overflow traffic as close as possible to said points of origin thereof within the network, said limiting step including the steps of:

measuring the degree of congestion within the traffic being carried by each route within the network;

calculating an average value of congestion within the traffic throughout all of the routes in the network; and selectively limiting said overflow traffic to make the traffic within each exchange and within each route approximately equal to said calculated average value of congestion.

12. A method of optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said method comprising the steps of:

selecting a degree of congestion which is permitted within the network;

storing in memory, levels of traffic which have historically been carried by the network for particular days and hours;

redimensioning the network in response to detecting any change in the traffic carrying capacity of the network, said redimensioning being based upon existing traffic carrying resources following said change in the traffic carrying capacity of the network;

calculating a maximum traffic carrying capacity of said redimensioned network for said selected degree of congestion;

comparing the maximum traffic carrying capacity of said redimensioned network to said stored historical levels for said particular days and hours to obtain a difference therebetween as overflow traffic information;

determining points of origin for the traffic on each route; and limiting said overflow traffic as close as possible to said points of origin thereof within the network, said limiting step including the steps of:

sending said overflow traffic information from a redimensioning module to a command conversion module;

converting said overflow information within said command conversion module into network management commands indicative of network traffic limitation functions; and sending said network management commands to the exchanges and routes within the network to limit said traffic.

13. A method of optimizing a telecommunications network for improved traffic carrying capacity, said network having a plurality of exchanges and a plurality of routes connecting those exchanges to one another with each of said routes being capable of carrying traffic between said exchanges in the network, said method comprising the steps of:

storing information within a memory to construct a network image, said information including number of exchanges in said network, size of each exchange, number and identity of the routes between different exchanges in the network, number of subscribers connected to each of said exchanges, estimated traffic per subscriber, and traffic interests within the network;

storing information within a memory to construct a network traffic history module, said network traffic history information including statistics on historical traffic levels for particular seasons, days, and hours;

storing actual network data within a memory, said data including traffic levels which are currently being offered to the network, amount of overflow traffic which is currently being rejected by the network, and an answer/seizure ratio within each exchange and each route of the network;

receiving status signals within an interface module from each route and exchange within the network, said module including sensors for generating interrupts in response to signals indicative of changes in status of each route and exchange;

comparing, in response to receiving signals indicating a change in status within said network, said actual network data to the information stored in said network image and said traffic history module to detect any change in the traffic carrying capacity of the network;

redimensioning the network in response to detecting any change in the traffic carrying capacity of the network, said redimensioning being based upon existing traffic carrying resources following said change in status within said network;

selecting a degree of congestion which is permitted within the network;

calculating a maximum traffic carrying capacity of said redimensioned network for the selected degree of congestion which is permitted in the network;

comparing the maximum traffic carrying capacity of said redimensioned network to said stored historical traffic levels for said particular seasons, days, and hours to obtain a difference therebetween as overflow traffic information;

determining points of origin for the traffic on each route; and converting said overflow traffic information into network management commands to limit said overflow traffic as close as possible to said points of origin thereof within the network and to avoid overload of the network with calls which cannot be completed within the particular value of congestion due to lack of network resources.

14. A method of optimizing a telecommunications network for improved traffic carrying capacity, said network having a plurality of exchanges and a plurality of routes connecting those exchanges to one another With each of said routes being capable of carrying traffic between said exchanges in the network as set forth in claim 13, said method further comprising the steps of:

setting alarm limits within said routes and exchanges for signaling alarm conditions; and changing said alarm limits within said routes and exchanges at different times to emphasize alarms during traffic busy hours within each route and exchange.

15. A method of optimizing a telecommunications network for improved traffic carrying capacity, said network having a plurality of exchanges and a plurality of routes connecting those exchanges to one another with each of said routes being capable of carrying traffic between said exchanges in the network as set forth in claim 13, said method further comprising the step of:

reassigning routes and circuits within the network based upon time differences within the network to take advantage of increased capacity during non-busy hours within each route and circuit.

16. A method of optimizing a telecommunications network for improved traffic carrying capacity, said network having a plurality of exchanges and a plurality of routes connecting those exchanges to one another with each of said routes being capable of carrying traffic between said exchanges in the network as set forth in claim 13 wherein said overflow traffic information converting step includes the steps of:

verifying said network management commands with stored off-line simulated events and proposing modified network management commands in response thereto;

determining whether the proposed network management commands improve network congestion conditions; and sending the proposed network management commands to affected routes and exchanges within the network in response to a determination that said commands will improve network congestion conditions.

17. A method of optimizing a telecommunications network for improved traffic carrying capacity, said network having a plurality of exchanges and a plurality of routes connecting those exchanges to one another as set forth in claim 13, further comprising the steps of:

simulating an event which reduces traffic carrying capacity within the network;

redimensioning the network in response to said simulated event to produce a redimensioned network;

evaluating said redimensioned network in terms of said network's effectiveness in restoring the traffic carrying capacity of the network after said simulated event;

creating and storing in memory a result file for said simulated event and responsive redimensioning;

setting plausibility limits for said simulated event and responsive redimensioning and adding said limits to said result file stored in memory;

simulating additional events and responsive redimensionings and adding said additional events and redimensionings to said result files;

comparing result files for each simulated event and redimensioning;

selecting a preferred sequence of network reconfiguration orders in response to particular simulated events based upon said comparisons of result files;

setting additional plausibility limits for said selected sequence of network reconfiguration orders; and issuing said selected network reconfiguration orders on-line to affected exchanges and routes within the network in response to a real event equivalent to a simulated event associated with said orders.

18. A system for providing improved performance of a telecommunications network by optimizing the network's traffic carrying capacity, said network having a plurality of exchanges and a plurality of routes connecting those exchanges to one another with each of said routes being capable of carrying traffic between said exchanges in the network, said system comprising:

means for measuring congestion levels within the traffic being carried by each route within the network;

means for calculating an average value of congestion within the traffic throughout all of the routes between said exchanges in the network; and means for redimensioning the network by rerouting and limiting the traffic within the routes between the exchanges in the network to bring the congestion levels within the traffic on each route between each exchange approximately equal to the average value of congestion within the traffic throughout all of the routes between the exchanges in the network, wherein said means for limiting the traffic within the routes includes:

means for determining points of origin for the traffic on each of said routes; and means for limiting the traffic on each route between exchanges in the network as close to said points of origin as possible within the network, said limiting means including means for instituting call restriction procedures within each exchange having anticipated traffic in excess of that which would produce a congestion value in the exchange greater than the average congestion value within the network.

19. A system for providing improved performance of a telecommunications network by optimizing the network's traffic carrying capacity, said network having a plurality of exchanges and a plurality of routes connecting those exchanges to one another with each of said route being capable of carrying traffic between said exchanges in the network as set forth in claim 18 wherein said means for instituting call restriction procedures within each exchange is selected from a group consisting of call gapping, traffic limitations on routes for non-priority traffic, cancel from procedures, cancel to procedures and skip procedures.

20. A system for optimizing a telecommunications network to which telecommunications traffic is being offered for improved traffic carrying capacity, said network having a plurality of exchanges and a plurality of routes connecting those exchanges to one another with each of said routes being capable of carrying traffic between said exchanges in the network, said system comprising:

means for calculating the traffic carrying capacity of the network for a selected degree of congestion within the network;

means for measuring the traffic being offered to the network;

means for comparing said calculated traffic carrying capacity to said measured traffic to determine a value of overflow traffic;

means for determining points of origin for the traffic on each of said routes; and means for limiting said overflow traffic as close to said points of origin thereof as possible within the network by instituting call restriction procedures within each exchange having overflow traffic, to reduce the measured traffic by the value of overflow traffic to achieve the calculated traffic carrying capacity for the selected degree of congestion within the network.

21. A system for optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said system comprising:

means for selecting a degree of congestion which is permitted within the network;

means for storing in memory, levels of traffic which have historically been carried by the network for particular days and hours;

means for redimensioning the network in response to detecting any change in the traffic carrying capacity of the network, said redimensioning being based upon existing traffic carrying resources following said change in the traffic carrying capacity of the network;

means for calculating a maximum traffic carrying capacity of said redimensioned network for said selected degree of congestion;

means for comparing the maximum traffic carrying capacity of said redimensioned network to said stored historical levels for said particular days and hours to obtain a difference therebetween as overflow traffic;

means for determining points of origin for the traffic on each route; and means for limiting said overflow traffic as close as possible to said points of origin thereof within the network by instituting call restriction procedures within each exchange having overflow traffic, to reduce the calculated traffic carrying capacity of said redimensioned network to equal said stored historical levels of traffic.

22. A system for optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said system comprising:

means for selecting a degree of congestion which is permitted within the network;

means for storing in memory, levels of traffic which have historically been carried by the network for particular days and hours;

means for redimensioning the network in response to detecting any change in the traffic carrying capacity of the network, said redimensioning being based upon existing traffic carrying resources following said change in the traffic carrying capacity of the network, said redimensioning means including:

means for selecting a computer program for dimensioning said network based upon anticipated traffic within the network and the traffic interests on said routes of the network;

means for inputting available resources of said network after a decrease in the traffic carrying capacity thereof into said program; and means for calculating the traffic carrying capacity of said network and the routes thereof with said program;

means for calculating a maximum traffic carrying capacity of said redimensioned network for said selected degree of congestion;

means for comparing the maximum traffic carrying capacity of said redimensioned network to said stored historical levels for said particular days and hours to obtain a difference therebetween as overflow traffic;

means for determining points of origin for the traffic on each route; and means for limiting said overflow traffic as close as possible to said points of origin thereof within the network.

23. A system for optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said system comprising:

means for selecting a degree of congestion which is permitted within the network;

means for storing in memory, levels of traffic which have historically been carried by the network for particular days and hours;

means for redimensioning the network in response to detecting any change in the traffic carrying capacity of the network, said redimensioning being based upon existing traffic carrying resources following said change in the traffic carrying capacity of the network;

means for calculating a maximum traffic carrying capacity of said redimensioned network for said selected degree of congestion;

means for comparing the maximum traffic carrying capacity of said redimensioned network to said stored historical levels for said particular days and hours to obtain a difference therebetween as overflow traffic;

means for determining points of origin for the traffic on each route; and means for limiting said overflow traffic as close as possible to said points of origin thereof within the network, said limiting means including means for instituting traffic management control function procedures within each exchange having anticipated traffic in excess of its historical traffic level for the selected permitted degree of congestion.

24. A system for optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said system comprising:

means for selecting a degree of congestion which is permitted within the network;

means for storing in memory, levels of traffic which have historically been carried by the network for particular days and hours;

means for redimensioning the network in response to detecting any change in the traffic carrying capacity of the network, said redimensioning being based upon existing traffic carrying resources following said change in the traffic carrying capacity of the network;

means for calculating a maximum traffic carrying capacity of said redimensioned network for said selected degree of congestion;

means for comparing the maximum traffic carrying capacity of said redimensioned network to said stored historical levels for said particular days and hours to obtain a difference therebetween as overflow traffic;

means for determining points of origin for the traffic on each route; and means for limiting said overflow traffic as close as possible to said points of origin thereof within the network, said limiting means including means for instituting call restriction procedures within each exchange having anticipated traffic in excess of its historical traffic level for the selected permitted degree of congestion.

25. A system for optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said system comprising:

means for selecting a degree of congestion which is permitted within the network;

means for storing in memory, levels of traffic which have historically been carried by the network for particular days and hours;

means for redimensioning the network in response to detecting any change in the traffic carrying capacity of the network, said redimensioning being based upon existing traffic carrying resources following said change in the traffic carrying capacity of the network;

means for calculating a maximum traffic carrying capacity of said redimensioned network for said selected degree of congestion;

means for comparing the maximum traffic carrying capacity of said redimensioned network to said stored historical levels for said particular days and hours to obtain a difference therebetween as overflow traffic;

means for determining points of origin for the traffic on each route; and means for limiting said overflow traffic as close as possible to said points of origin thereof within the network, said limiting means including:

means for measuring the degree of congestion within the traffic being carried by each route within the network;

means for calculating an average value of congestion within the traffic throughout all of the routes in the network; and means for selectively limiting said overflow traffic to make the traffic within each exchange and within each route approximately equal to said calculated average value of congestion.

26. A system for optimizing a telecommunications network for improved traffic carrying capacity, said network having a plurality of exchanges and a plurality of routes connecting those exchanges to one another with each of said routes being capable of carrying traffic between said exchanges in the network, both said exchanges and said routes having been previously dimensioned based upon anticipated traffic and traffic interests to various destinations of said routes, said system comprising:

means for selecting a degree of congestion which is permitted within the network;

means for storing in memory, levels of traffic which have historically been carried by the network for particular days and hours;

means for redimensioning the network in response to detecting any change in the traffic carrying capacity of the network, said redimensioning being based upon existing traffic carrying resources following said change in the traffic carrying capacity of the network;

means for calculating a maximum traffic carrying capacity of said redimensioned network for said selected degree of congestion;

means for comparing the maximum traffic carrying capacity of said redimensioned network to said stored historical levels for said particular days and hours to obtain a difference therebetween as overflow traffic information;

means for determining points of origin for the traffic on each route; and means for limiting said overflow traffic as close as possible to said points of origin thereof within the network, said limiting means including:

means for sending said overflow traffic information from a redimensioning module to a command conversion module;

means for converting said overflow information within said command conversion module into network management commands indicative of network traffic limitation functions; and means for sending said network management commands to the exchanges and routes within the network to limit said traffic.

27. A system for optimizing a telecommunications network for improved traffic carrying capacity, said network having a plurality of exchanges and a plurality of routes connecting those exchanges to one another with each of said routes being capable of carrying traffic between said exchanges in the network, said system comprising:

means for storing information within a memory to construct a network image, said information including number of exchanges in said network, size of each exchange, number and identity of the routes between different exchanges in the network, number of subscribers connected to each of said exchanges, estimated traffic per subscriber, and traffic interests within the network;

means for storing information within a memory to construct a network traffic history module, said network traffic history information including statistics on historical traffic levels for particular seasons, days, and hours;

means for storing actual network data within a memory, said data including traffic levels which are currently being offered to the network, amount of overflow traffic which is currently being rejected by the network, and an answer/seizure ratio within each exchange and each route of the network;

means for receiving status signals within an interface module from each route and exchange within the network, said module including sensors for generating interrupts in response to signals indicative of changes in status of each route and exchange;

means for comparing, in response to receiving signals indicating a change in status within said network, said actual network data to the information stored in said network image and said traffic history module to detect any change in the traffic carrying capacity of the network;

means for redimensioning the network in response to detecting any change in the traffic carrying capacity of the network, said redimensioning being based upon existing traffic carrying resources following said change in status within said network;

means for selecting a degree of congestion which is permitted within the network;

means for calculating a maximum traffic carrying capacity of said redimensioned network for the selected degree of congestion which is permitted in the network;

means for comparing the maximum traffic carrying capacity of said redimensioned network to said stored historical traffic levels for said particular seasons, days, and hours to obtain a difference therebetween as overflow traffic information;

means for determining points of origin for the traffic on each route; and means for converting said overflow traffic information into network management commands to limit said overflow traffic as close as possible to said points of origin thereof within the network and to avoid overload of the network with calls which cannot be completed within the particular value of congestion due to lack of network resources.

28. A system for optimizing a telecommunications network for improved traffic carrying capacity, said network having a plurality of exchanges and a plurality of routes connecting those exchanges to one another with each of said routes being capable of carrying traffic between said exchanges in the network as set forth in claim 27, said system further comprising:

alarm limits within said routes and exchanges for signaling alarm conditions; and means for changing said alarm limits within said routes and exchanges at different times to emphasize alarms during traffic busy hours within each route and exchange.

29. A system for optimizing a telecommunications network for improved traffic carrying capacity, said network having a plurality of exchanges and a plurality of routes connecting those exchanges to one another with each of said route being capable of carrying traffic between said exchanges in the network as set forth in claim 27, said system further comprising:

means for reassigning routes and circuits within the network based upon time differences within the network to take advantage of increased capacity during non-busy hours within each route and circuit.

30. A system for optimizing a telecommunications network for improved traffic carrying capacity, said network having a plurality of exchanges and a plurality of routes connecting those exchanges to one another with each of said routes being capable of carrying traffic between said exchanges in the network as set forth in claim 27 wherein said means for converting overflow traffic information includes:
- means for verifying said network management commands with stored off-line simulated events and proposing modified network management commands in response thereto;
- means for determining whether the proposed network management commands improve network congestion conditions; and
- means for sending the proposed network management commands to affected routes and exchanges within the network in response to a determination that said commands will improve network congestion conditions.

31. A system for optimizing a telecommunications network for improved traffic carrying capacity, said network having a plurality of exchanges and a plurality of routes connecting those exchanges to one another with each of said routes being capable of carrying traffic between said exchanges in the network as set forth in claim 27, further comprising:
- means for simulating an event which reduces traffic carrying capacity within the network;
- means for redimensioning the network in response to said simulated event to produce a redimensioned network;
- means for evaluating said redimensioned network in terms of said network's effectiveness in restoring the traffic carrying capacity of the network after said simulated event;
- means for creating and storing in memory a result file for said simulated event and responsive redimensioning;
- means for setting plausibility limits for said simulated event and responsive redimensioning and adding said limits to said result file stored in memory;
- means for simulating additional events and responsive redimensionings and adding said additional events and redimensionings to said result files;
- means for comparing result files for each simulated event and redimensioning;
- means for selecting a preferred sequence of network reconfiguration orders in response to particular simulated events based upon said comparisons of result files;
- means for setting additional plausibility limits for said selected sequence of network reconfiguration orders; and
- means for issuing said selected network reconfiguration orders on-line to affected exchanges and routes within the network in response to a real event equivalent to a simulated event associated with said orders.

* * * * *

UNITED STATES PATENT AND TRADEMARK OFFICE
CERTIFICATE OF CORRECTION

PATENT NO. : 5,359,649
DATED : Oct. 25, 1994
INVENTOR(S) : Rosu, Corneliu S. et al.

It is certified that error appears in the above-indentified patent and that said Letters Patent is hereby corrected as shown below:

Column 8, line 48         Replace "NABEFA"
                              With --NABEFA1--

Column 22, line 5         Replace "present-invention"
                              With --present invention--

Column 23, line 65        Replace "exchange"
                              With --exchanges--

Column 24, line 6         Replace "characteristics"
                              With --characteristic--

Column 24, line 52        Replace "exchange"
                              With --exchanges--

Column 29, line 60        Replace "With"
                              With --with--

Column 31, line 34        Replace "route"
                              With --routes--

UNITED STATES PATENT AND TRADEMARK OFFICE
CERTIFICATE OF CORRECTION

PATENT NO. : 5,359,649
DATED : Oct. 25, 1994
INVENTOR(S) : Rosu, Corneliu S. et al.

It is certified that error appears in the above-indentified patent and that said Letters Patent is hereby corrected as shown below:

Column 36, line 55     Replace "route"
                           With --routes--

Signed and Sealed this

Twenty-third Day of July, 1996

Attest:

BRUCE LEHMAN

Attesting Officer     Commissioner of Patents and Trademarks